(12) United States Patent
Soar

(10) Patent No.: US 9,912,174 B2
(45) Date of Patent: Mar. 6, 2018

(54) INDUCTIVELY COUPLED WIRELESS POWER AND DATA FOR A GARMENT VIA A DONGLE

(71) Applicant: Cynetic Designs Ltd., Kelowna (CA)

(72) Inventor: Roger J Soar, Kelowna (CA)

(73) Assignee: Cynetic Designs Ltd., Kelowna (CA)

( * ) Notice: Subject to any disclaimer, the term of this patent is extended or adjusted under 35 U.S.C. 154(b) by 281 days.

(21) Appl. No.: 14/890,269

(22) PCT Filed: May 12, 2014

(86) PCT No.: PCT/CA2014/000423
§ 371 (c)(1),
(2) Date: Nov. 10, 2015

(87) PCT Pub. No.: WO2014/179869
PCT Pub. Date: Nov. 13, 2014

(65) Prior Publication Data
US 2016/0094051 A1 Mar. 31, 2016

Related U.S. Application Data

(60) Provisional application No. 61/822,140, filed on May 10, 2013.

(51) Int. Cl.
*H02J 5/00* (2016.01)
*H04B 5/00* (2006.01)
*H02J 17/00* (2006.01)

(52) U.S. Cl.
CPC ............ *H02J 5/005* (2013.01); *H04B 5/0031* (2013.01); *H04B 5/0037* (2013.01); *H04B 5/0081* (2013.01); *H02J 17/00* (2013.01)

(58) Field of Classification Search
None
See application file for complete search history.

(56) References Cited

U.S. PATENT DOCUMENTS

| D572,189 S | 7/2008 | Sarnowsky et al. |
| 7,462,951 B1 | 12/2008 | Baarman |
| 7,612,528 B2 | 11/2009 | Baarman et al. |
| 7,863,859 B2 | 1/2011 | Soar |
| 7,994,752 B2 | 8/2011 | Soar |
| 8,203,657 B2 | 6/2012 | Vitito |

(Continued)

*Primary Examiner* — Jared Fureman
*Assistant Examiner* — Aqeel Bukhari
(74) *Attorney, Agent, or Firm* — Antony C. Edwards

(57) ABSTRACT

A system for transmission of at least power using inductive wireless coupling includes an environmentally sealed dongle and a mounting component which releasably mates with the dongle. The dongle is sized for use with one hand, and may be coupled by an umbilical to either a garment of the user or to a vehicle structure for example a seat, in which case the mounting component is coupled to the vehicle structure or to the garment respectively. The dongle and the mounting component include first and second inductive coils respectively and corresponding ferrite cores. The coils are positioned within the dongle and mounting component so that they are aligned for their inductive coupling when the dongle and mounting component are mated. The positioning and alignment of the coils provides a substantially closed magnetic path between the coils. The mounting component may be a receptacle.

22 Claims, 11 Drawing Sheets

(56) References Cited

U.S. PATENT DOCUMENTS

| | | |
|---|---|---|
| 9,126,514 B2 | 9/2015 | Soar |
| 2010/0194350 A1* | 8/2010 | Chatterjee ............ G06F 3/03543 |
| | | 320/137 |
| 2011/0018498 A1 | 1/2011 | Soar |
| 2011/0164471 A1 | 7/2011 | Baarman et al. |
| 2012/0206097 A1 | 8/2012 | Soar |
| 2013/0005251 A1 | 1/2013 | Soar |
| 2013/0175874 A1* | 7/2013 | Lou ...................... H04B 5/0037 |
| | | 307/104 |
| 2014/0021798 A1* | 1/2014 | Kesler .................... H02J 17/00 |
| | | 307/104 |

* cited by examiner

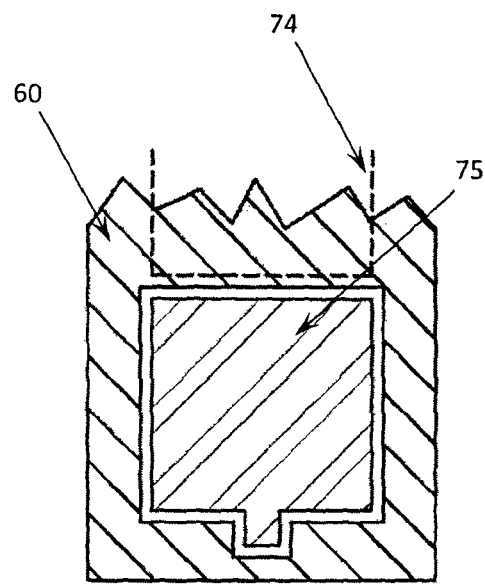
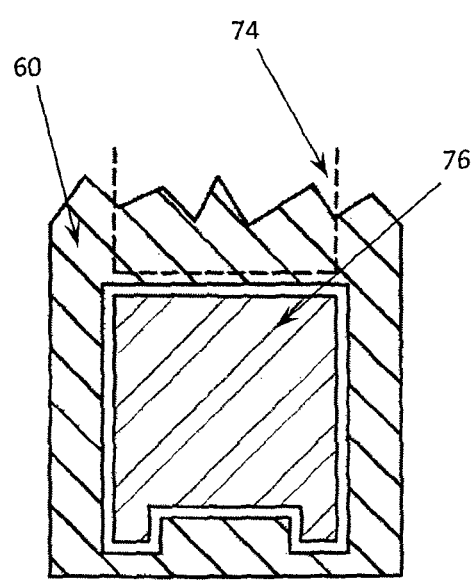
Figure 8A                     Figure 8B
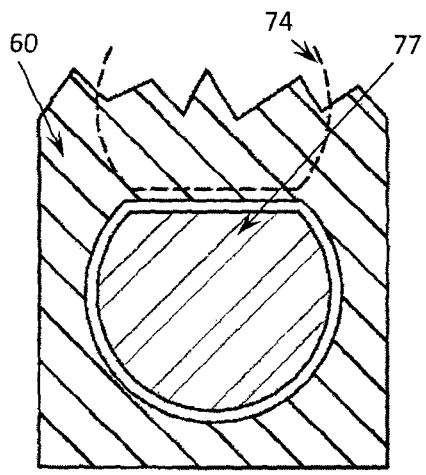
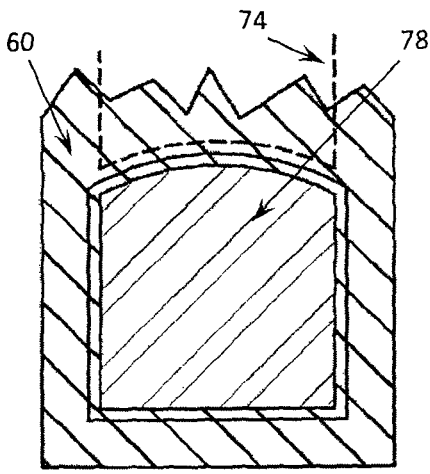
Figure 8C                     Figure 8D

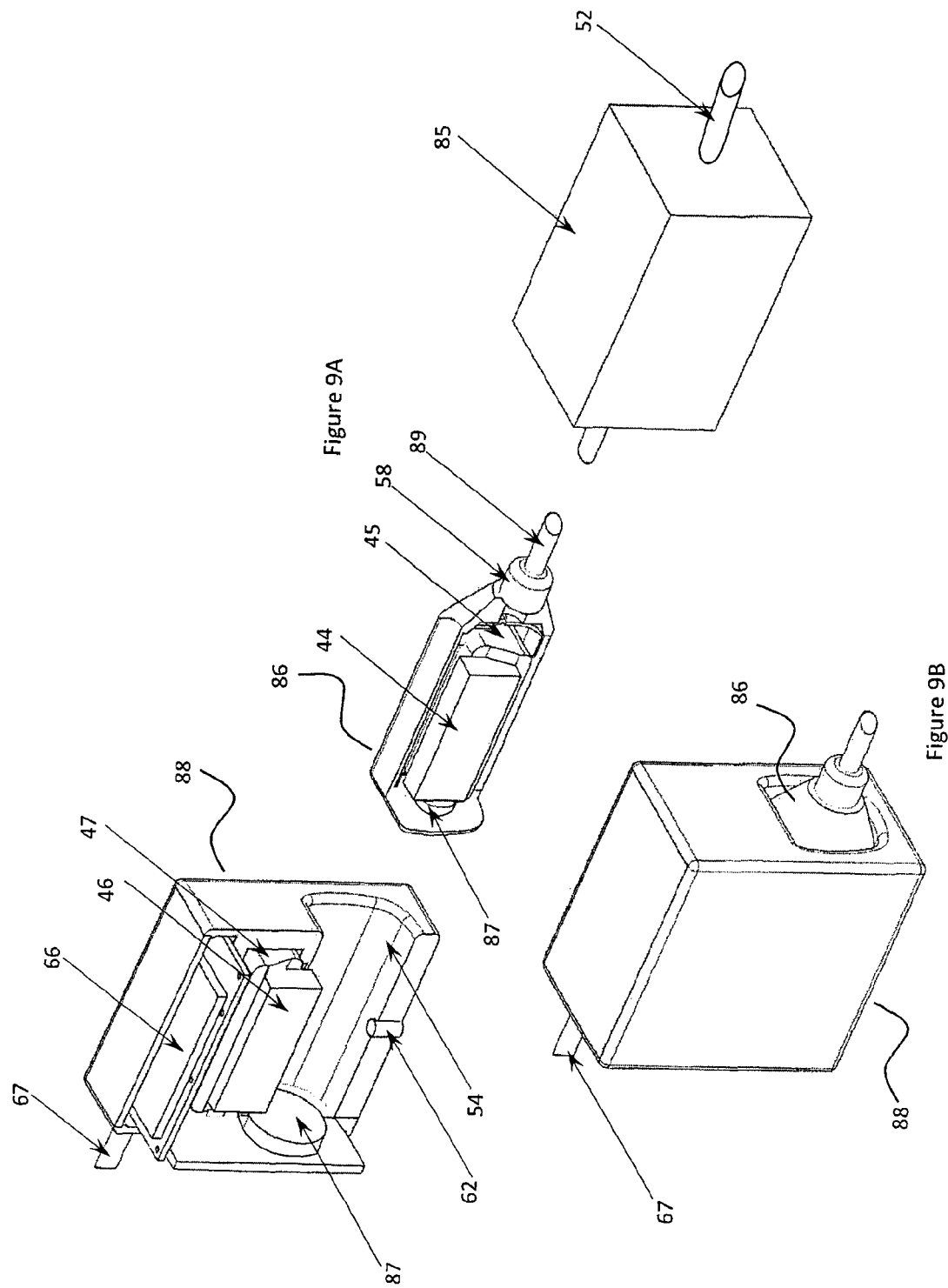

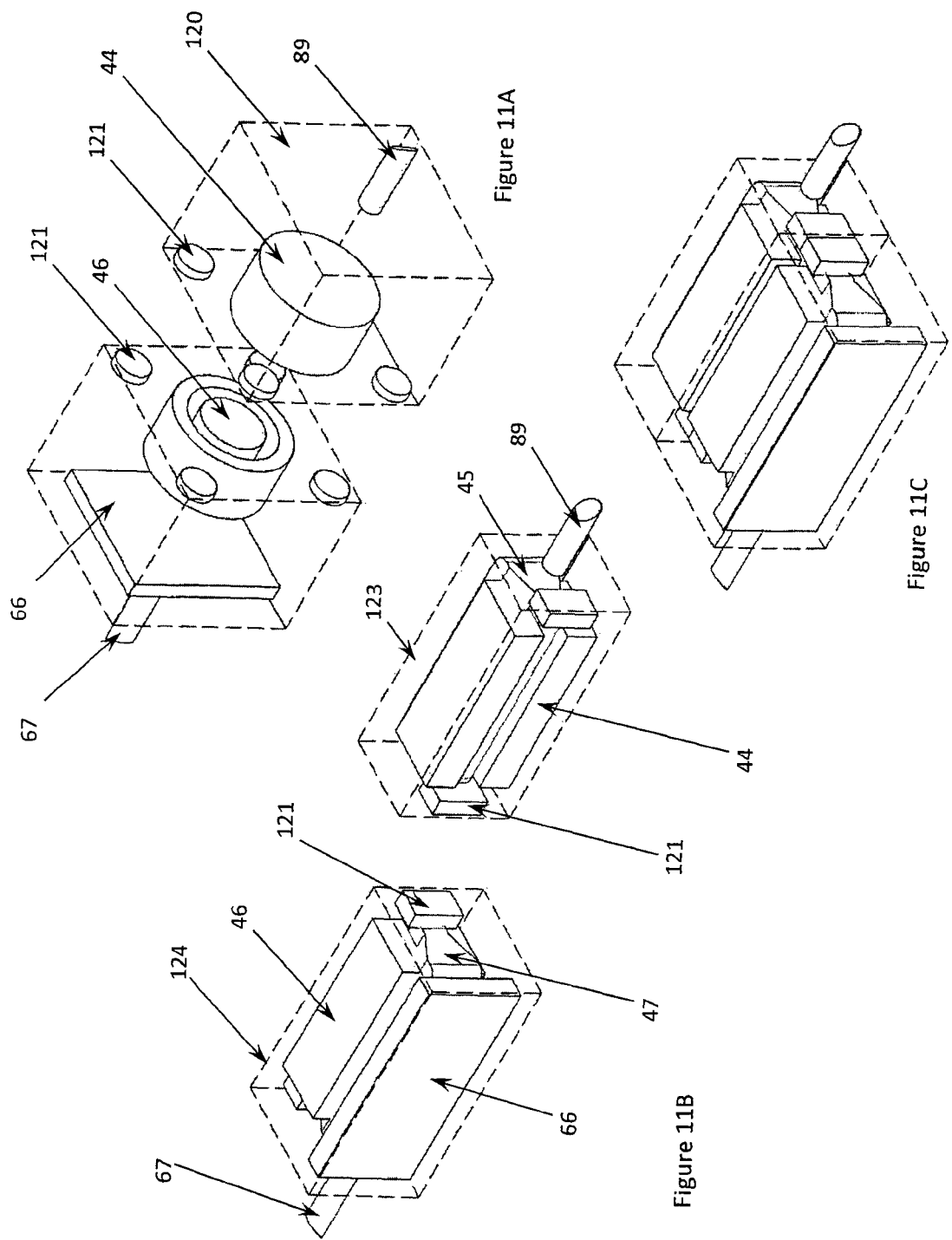

INDUCTIVELY COUPLED WIRELESS POWER AND DATA FOR A GARMENT VIA A DONGLE

FIELD OF THE INVENTION

This invention relates to the field of devices using inductive coupling to transmit power and data, and in particular to a method and system for inductively coupled wireless transmission of power, or power and data, via dongle and a mounting component coupled between a garment and a structure of a vehicle.

BACKGROUND

Many patented applications of inductive charging now specifically reference the wireless or inductive charging of mobile electronic devices in both indoor environments and also within vehicles so as to remove the clutter and need for various charging cables that interface to the different devices. Inductive coupling frequently uses the application of charging pads, cradles or holders that incorporate mechanical, magnetic or printed means of providing or indicating alignment of the primary and secondary inductive coils to enable and obtain optimal transfer efficiencies between the primary transmit circuit and the receiving secondary circuit. Other patents discuss the application of multiple primary coils arranged in various arrays, so that the device to be charged can be placed in a variety of locations or orientations on the flat pad charging device.

For those devices that are placed in vehicles, Sarnowsky in D572,189 S shows the implementation of in-vehicle inductive charging to a mobile device placed within a cup holder, while Baarman in U.S. Pat. No. 7,612,528 describes the charging of devices placed within a holder that maybe located in the vehicle console, sun visor, trunk, seat pocket, door stowage compartment and glove compartment. Baarman also describes the ability of a removable device to wirelessly communicate with the vehicle data bus when placed within the holder for the purposes of transferring voice, audio and device charge status data to the vehicle. In U.S. Pat. No. 7,462,951, Baarman describes the application of inductive charging to hand held tools where a tool box, which may be placed within a vehicle and connected to vehicle power, is equipped with inductive charging locations into which a portable power tool can be placed to receive a charge. Vitito in U.S. Pat. No. 8,203,657 describes the inductive charging of mobile entertainment system embedded within a car seat headrest. Soar in US Patent Application US2013/0005251 A1 01, 2013 describes the charging of a central battery within a tactical vest.

None of the references cited describe the provision of wireless power to a tactical garment with a central rechargeable battery(ies) and or soldier power management charger that in turn provides power to vest mounted distributed electronic devices within a battlefield environment, within a vehicle, vessel or aircraft or in a forward or rear operating base or barrack. With the exception of Soar, the above mentioned prior art describes the application of inductive chargers in a clean indoor type of environment such as on top of furniture, within gloves boxes or in vehicle consoles where both the charger and the device are not envisioned to be exposed to harsh environmental elements. The proposed invention is seat or support mounted inductive charging system for a tactical vest with central battery which is suitable for application in a harsh environment.

Soar in US Patent Application US2013/0005251 A1 01, 2013 does describe the charging of a central battery within a tactical vest using inductive power transfer. Soar describes using large planar coils that are placed in a vertical or matrixed array configurations to accommodate different soldier torso lengths and provide primary to secondary coil alignment for efficient inductive coupling, wherein there is loss of inductive coupling when the soldier moves in his seat and so as to create a horizontal separation distance sufficient to both significantly decrease the inductive coupling efficiency and therefore inductive power transfer efficiency to pre-determined cut-off points. In addition as the distance between the planar primary and secondary coils is increased the radiation of magnetic energy into free space also increases. This stray magnetic flux may cause electromagnetic interference (EMI) to other electronic systems that requires additional shielding or mitigation strategies.

As the soldier moves about in his seat and depending on the number of items carried on his back, such as a water pouch, radios or other devices, the separation distance between the secondary coil on the soldier and primary coil in the seat back will vary. When the coils are in close proximity the coupling efficiency is high, however as the separation distance is increased to greater than about 2.5 cm (one inch) the power transfer efficiency of the system will decrease. This both decreases the charge rate of the central soldier battery and power transfer inefficiency places increased burden on the vehicles electrical system, given eight to ten troops within the vehicle. A further consequence of the planar coil system is that the secondary coil carried by the soldier, if backed by ferrite material, may represent a significant additional weight that must be carried by the soldier.

Suggestions of a system such as described by Soar but using magnetic resonance for the wireless power transfer actually exacerbates the above problems, for as the standoff between the seat mounted primary coil and secondary coil on the soldiers garment increases the magnetic power radiated by the primary coil continues to be transmitted over larger distances rather than being converted to energy by the secondary coil (FIGS. 2A and 2B).

SUMMARY OF THE INVENTION

The invention described herein an inductive wireless power transfer system wherein a secondary inductive power coil assembly is contained within a small dongle that is in a preferred embodiment located on the end of a short umbilical cable connected to a soldier power management system in a soldier's tactical garment. The secondary coil receives wireless inductive power from a primary inductive charge unit located within a vehicle. When the soldier sits in a vehicle seat the secondary coil dongle is in one embodiment, inserted into a primary charging receptacle that is located on or immediately adjacent to the troop seat. When the dongle is placed into the wireless power receptacle, it is recognised by the primary circuit and power is transferred to the soldier system without the need of any electro-mechanical sockets or connectors. As there are no electro-mechanical connections to be made or broken, little to no dis-connect force is required to separate the connection and at any time the soldier can stand up and the dongle slides out of the receptacle. The inductive charging transformer circuit utilises closely coupled ferrite cores that inherently reduce stray magnetic field to low levels. Additionally, the primary power unit housing provides the opportunity for implementation of secondary shielding. The system may also incorporate a secure means of providing connectorless RF or NFC audio communication and data streams across distances of less than 2 cm provide a high efficiency design with low possibility of magnetic field emissions and, when used for wireless communication and data transmission, the antennas are sufficiently close and shielded that cross talk between neighbouring devices will be eliminated.

While also eliminating the need for exposed electro-mechanical connections and associated failure prone cables and connectors, the dongle inductive charger system described herein provides an environmentally insensitive, that is, environmentally sealed and functioning in harsh conditions, encapsulated power transfer system that can operate in harsh weather or adverse environmental conditions such as mud, sand, dirt, ice, snow, rain. The system may be exposed to man-made contaminants such as petroleum, oil, lubricants and biological and chemical agents that may be found both outside or inside a military or other similar vehicle. Additional battlefield or war-fighting environmental requirements include the ability of the charger to withstand being fully submersed while performing inductive charging functions or being washed down. The primary charging receptacle may be designed such that dirt, fluids, and contaminants may pass through the primary charging device and not collect in the bottom of the primary charger, which over time, as the dirt or ice builds up within, would prevent proper alignment of the primary and secondary coils and impede the function of the device. Further implementations of the vest dongle charger system allows the charger to be used in barracks or other non-mobile applications.

In the applicant's experience there is general consensus today that the personal electrical power requirements of the soldier or Marine will continue to increase at a relatively rapid rate. The requirements for improved power management, power distribution and reduced weight of batteries are ongoing. A key component of this system is the utilisation of a central power source that could be any of several technologies including primary batteries, rechargeable (secondary) batteries or fuel cells. Most soldier modernisation system designs favour that of rechargeable batteries as the central power source. The central battery may be swapped out and be replaced by another battery that is fully recharged, however there is also the option for charging the central battery while it is still being utilised and carried by the soldier within his tactical clothing.

The need to charge batteries of electronic equipment on a modernised solider when the soldier is away from base support has been recognised as a significant logistic problem since the original concept of the soldier modernisation programmes. The provision of a rechargeable central power source to the soldier provides several options to input power when separated from barracks or forward operating base charging facilities. These options would include solar power, energy harvesting, AC recharging and the ability to access vehicle, aircraft or marine transport electric power. A unique opportunity to recharge the battery presents itself when the soldier is being transported by a vehicle such as LAV, HMMV, or any other military vehicle that provides both seats for occupants and a power source for charging.

To the knowledge of the applicant, a primary objective of current US Soldier modernisation programme research is to examine the potential for increasing the ruggedness, decreasing the cost and or weight of the system by improving the electrical connectors and cable/connector assemblies in future equipment ensembles.

The existing round plug-ins for the cables are bulky, costly and prone to failure because pin-and-socket electro-mechanical connections are not sufficiently robust. Existing connectors have a low life expectancy and exhibit consistent failures of the connector pins and sockets. As no electro-mechanical connections are required for inductive power transfer and both sides of the system can be completely encapsulated, the inductive power transfer can be performed when subject to all types of environmental contamination such as sand, dirt, water, snow and ice that would quickly render a conventional connector in-operable.

The present invention provides a wireless inductive charging dongle that in one embodiment is mounted as a sub-system on a soldier's tactical garment and provides the wireless transfer of power, that is without the use of an electro-mechanical connector, and may also provide data communications to the soldier from a vehicle. Within the context of this description, a vehicle describes any mobile platform such as a car, truck, armoured personnel carrier, aircraft, spacecraft, boat or vessel, submersible or semi-submersible watercraft, motorcycle, all terrain vehicle, etc. Each seat within the vehicle can be fitted with primary inductive charging and communications capability. Each of the troop seats may be identically fitted so that the same capability is provided regardless of which seat a soldier would seat in (FIG. 6,7). The moment a soldier is seated, the soldier inserts the charging dongle into the primary charging receptacle and immediately begins to wirelessly receive power, and in some embodiments also vehicle communications and data such as video, text, images, etc. Once an inductive connection is made between the primary and secondary coils, the rechargeable central power source may instantly start to receive power. The amount of power that can be delivered via the inductive charging would be determined by the capacity of the batteries carried by the soldier, with no reasonable upper limit on the capacity to be charged. At the same time an NFC or RF communications link such as Bluetooth or WiFi may be established between the soldier and the primary charging unit providing the soldier with inter and intra vehicle communications capability.

The inductive charging system may be designed to attach to new seats or may be retro-fitted onto existing vehicle seating or otherwise mounted to other vehicle structures. Multiple methods of attaching and arranging the primary charging unit to the seat or vehicle can be designed to provide this same functionality as described.

The primary inductive driver circuit can be configured to accommodate any type of input power including both AC and DC power inputs. Typical military aircraft and vehicle power input requirements would be 28 VDC, whereas many commercial vehicles would be 12 VDC. Interface may also be required to a CANBUS system or Common Modular Power System (CMPS) smart vehicle system for easy configuration and diagnostic capability.

Next generation commercial and military vehicles will employ higher voltage energy storage plants such as Lithium-Ion Batteries or Super Capacitors. These will typically operate at around 300 VDC to optimize hybrid motor operation. The ability to provide significant amounts of power at higher voltages may dictate new inputs for power conversion systems. The use of a higher voltage input within a power converter would allow a reduction in physical size and operating currents.

At the present time it is expected that initial power output to the battery charging circuit to be approximately 50 W which would allow the charging of one 100 W battery at a 0.5 C charge rate. However in the foreseeable future, the charge rate capacity of soldier system main power batteries will increase to as much as 2 C or greater. As it will be very desirable to charge the main batteries as quickly as possible to obtain as much power in what may be very short time periods, the output of the primary device will need to be in the order of 100 W or greater. If charging power requirements are reduced, then the charger provides lower amounts of power as required or may even be turned off.

The secondary circuit of the inductive power transfer system, the AC rectification and voltage regulation circuit can be configured to provide a specific DC voltage to the battery charging circuit, with the voltage range typically in the range of 15-24 volts DC or higher in the future as required. The battery charging circuit may be designed to accommodate SMBus battery data protocols.

In summary, in one aspect, the invention may be characterized as a system for the transmission of at least power using inductive wireless coupling, wherein the system may include a dongle having a housing which is environmentally sealed, and a mounting component configured to selectively releasably mate with the dongle, wherein the dongle is sized to substantially fit in a palm of a user.

One of the dongle or the mounting component is adapted for coupling to one of a garment or a structure of a vehicle. The other of the dongle or the mounting component is adapted for coupling to the other of the garment or the structure of the vehicle. That is, if the dongle, as broadly referred to herein, is adapted for coupling to the garment, as broadly referred to herein, then the mounting component, as broadly referred to herein, is adapted for coupling to the structure of the vehicle. Or, if the dongle is adapted for coupling to the structure of the vehicle (wherein the structure is defined to include seats and other structure or accessories in or on a vehicle), then the mounting component is adapted for coupling to the garment.

In a preferred embodiment, the adaption for coupling to the garment or the structure of the vehicle includes an umbilical having a length of substantially in the ranges of 0-30 cm, 0-100 cm respectively.

The dongle and the mounting component contain first and second inductive coils and advantageously include corresponding ferrite cores respectively. The first and second coils are configured to be aligned for the inductive coupling when the dongle and the mounting component are mated so as to provide a substantially closed magnetic path between the first and second coils for at least transfer of power between the first and second coils.

The umbilical may be mounted at a first end thereof to the dongle, or the umbilical may be mounted at a first end thereof to the mounting component. The opposite second end of the umbilical may be adapted to be mounted to the garment or the structure of the vehicle as the case may be.

The housing of the mounting component may be chosen from at least one of the group comprising: a hollow receiver, a hollow receptacle, a housing having planar coupling surface for planar surface-to-planar surface inductive coupling, a housing having linear alignment mechanism, a housing having hollow receiver and internal linear alignment mechanism, a housing having threaded coupling, a housing having a pull-away coupling, a housing having a pull-away alignment mechanism, a housing having releasable fasteners, a housing having releasable fasteners on a planar surface thereof, a housing having a resilient breakaway coupling.

The housing of the dongle may be chosen, correspondingly so as to couple with the mounting component, from at least one of the group comprising: a housing which includes a cube, a housing which includes a cylinder, a housing which includes a cuboid, a housing which is at least partly conical, a housing which is at least partly frusto-conical, a housing which includes a spheroid, a housing which includes a prism, a housing which includes a poly-hedron, a housing which includes a paraboloid, a housing which includes an ellipsoid.

In a preferred embodiment the coils have a low direct current resistance.

In one embodiment where the mounting component is a receptacle, and thus the dongle mates in the receptacle, the receptacle may include a drain, whereby the receptacle is self-draining of fluids. The drain may include at least one aperture for clearing solids therethrough.

In one embodiment the mounting component is a shielded receptacle, and the coils are adapted for inductive transmission of data. RF and/or NFC modules may also be employed for transmission of data. The data may be images, video, text, voice.

When the dongle or the mounting component are coupled to the garment, the dongle or the mounting component when so coupled may be positioned in a pocket of the garment. When the mounting component is a receptacle and thus the dongle mates in mating engagement in the receptacle, the mating engagement preferably is a self-releasing sliding engagement aligned in an alignment so as to release the engagement as a user wearing the garment dis-engages from the structure of the vehicle. Thus where the structure of the vehicle includes a seat, the dis-engagement of the user occurs when the user stands-up from a seated position seated in the seat. The alignment may be substantially in the range 30-150 degrees measured from vertical. The alignment of the mating engagement may be at a fixed inclination or the alignment may not be fixed. In one embodiment the mounting component is substantially vertically mounted so as to be upright and is not fixed so as to allow self-aligning movement of the alignment during the dis-engagement.

Advantageously, at least one of the ferrite cores is chosen from the group comprising: an elongated u-core, an elongated e-core.

BRIEF DESCRIPTION OF THE DRAWINGS

In the accompanying Figures like reference numerals denote corresponding parts in each view, and wherein:

FIG. 8. Examples of how the dongle can be keyed to ensure correct orientation within the charger housing receptacle.

FIG. 9. Illustration of an alternate mechanical configuration for the dongle power transfer system, where the dongle is the primary inductive assembly and the receptacle housing is the secondary inductive assembly with integrated secondary voltage conditioning circuit.

FIGS. 11A-11C illustrate a method of aligning the primary and secondary coil housings, each with at least one planar surface, wherein the physical housing itself does not provide any physical retention or location assistance to the alignment of the primary and secondary inductive coils.

DETAILED DESCRIPTION OF EMBODIMENTS OF THE INVENTION

Overview of Dongle Charger

Figure 3A:
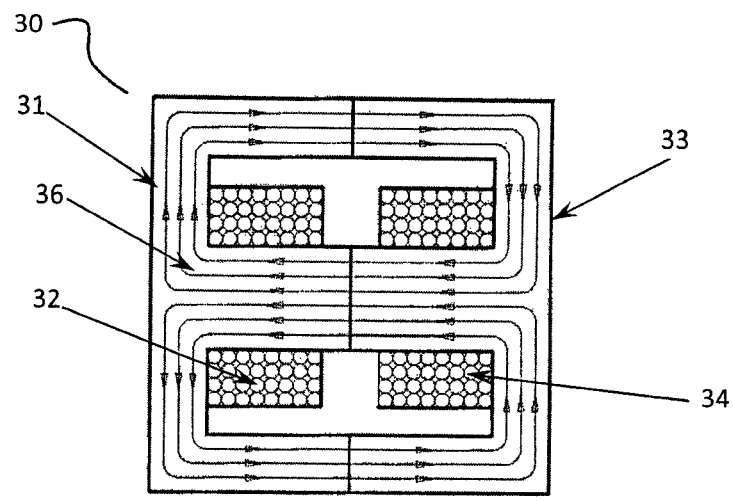
FIG. 3. Two examples of E-core ferrite profile arranged as transformer pairs showing the effect on the magnetic path and stray magnetic flux determined by the air gap between the E-core pole faces.
Figure 3B:
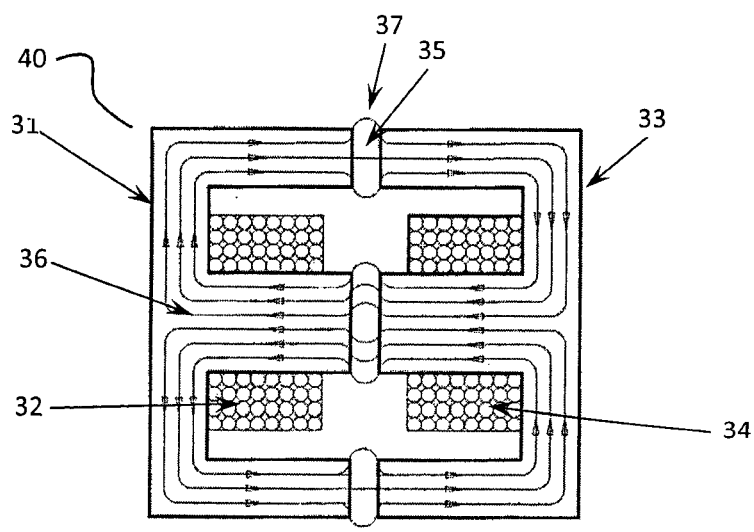

The present invention is an inductive wireless charging system that utilises two separable power ferrite core halves (FIGS. 1A-1F) that form an inductive air core transformer. The system is described as a charger as that is its usual function to provide power to charge a central battery carried by the soldier or user. The system may however be viewed simply as a power transfer system or as a data transfer system, or combination of these. A primary charging unit is attached to a vehicle seat or other support structure and receives electrical power from the vehicle. It contains an inductive power circuit that drives a primary inductive winding that is positioned on a ferrite power core. In one embodiment the ferrite core is located directly adjacent to a receptacle within the primary charging housing such that the pole or poles (legs) or pot of the ferrite core (herein collectively referred to as the ferrite core) align and allow the formation of a substantially closed magnetic path when a similar secondary ferrite power core with windings contained within a small dongle profile, for example palm size, is placed into the receptacle. The small profile dongle is attached by a short umbilical to a secondary voltage conditioning module on the tactical garment of a soldier. The dongle housing encapsulates the secondary inductive coil assembly component of the inductive transformer. The substantially closed magnetic path formed between the primary and secondary coil and core assemblies provides for the efficient transmission of power and/or inductively transmitted data using the inductive coupling between the coil assemblies (FIGS. 3A and 3B).

As used herein, reference to a dongle or dongle housing means a rigid or semi-rigid, non-magnetic, non-metallic housing as better described below, typically sized so that it may be held in one hand by a user, and so that the user may orient and guide the dongle with on hand. Thus, in order to achieve this utility, the dongle is referred to herein as being palm-sized. Palm-sized, as used herein, is intended to mean such shapes and dimensions so that the dongle is easily gripped in one hand and manipulated using only one hand. Thus for example the dongle may, for a rectangular dongle housing, have dimensions substantially in the following ranges: length 3 cm to 10 cm, width 1 cm to 4 cm, height 1 cm to 4 cm, although these are not intended to be limiting.

When combined with an optimal seat attachment location for the primary charging unit, for example, near the hip of a soldier, a short umbilical, such as a flexible or resilient cable, between the dongle and the secondary voltage conditioning module, allows the soldier considerable latitude of movement, even allowing him to lean forward within his seat without interrupting the flow of wireless power from the seat to the vest. With a seat back mounted primary planar coil assembly and a back mounted planar secondary coil on the soldier, using either inductive or magnetic resonance coil coupling, as a soon as a soldier leans forward and both the distance and angle of the coils vertical planes increases or deviates from being parallel, the transfer efficiency and transfer of power follows the inverse squared law for separation by distance and the coil coupling is reduced by the cosine of the angle of rotation. When taken in conjunction, the power transfer levels quickly fall below unacceptable levels. In addition, as the coil coupling efficiency decreases the amount of magnetic radiation emitted by the primary coil into free space increases as its energy is not captured by the secondary coil. All of the above issues are eliminated by the dongle vest charger power transfer system which is especially effective when the receptacle is positioned near the hip, as the receptacle, especially if flexibly or pivotally mounted allows for self-aligning with the dongle as the user moves in the seat, which maintains high efficiency power transfer and low magnetic radiation even as the soldier moves around in his seat.

A further advantage of the dongle and receptacle inductive power transfer system is that it is somewhat insensitive to the human factor aspect of the user. Whereas in the prior art, Soar must use a coil array or coil matrix to cover the range of user torso length to maintain alignment between the transmitting and receiving planar coils, a dongle on an umbilical is usually not affected by user variation in stature, further reducing the complexity of either new or retrofit vehicle installations, such as on vehicle seats. Further, the receptacle is advantageously positioned so that the soldier may find it without having to visually search for it, and may then mate the dongle into the receptacle by tactile feedback alone. This is useful in that typically a soldier will not be able to see past the waist because of the vest and equipment blocking the sight-line. Also, typically, the lighting may be dim within a military vehicle requiring tactile insertion of the dongle.

An alternate mechanical embodiment versus that previously described is when the dongle is the primary inductive component and is driven by the primary inductive power circuit. Electrically the system remains unchanged as the primary and secondary ferrites and coil components of the air core transformer and their position relative to each, and the circuits they are connected to remain unchanged. The dongle now becomes the primary inductive driver and is attached to the primary circuit which receives power and data from the vehicle. It is then inserted into the secondary receptacle which is now carried for example in or as a small pocket on the soldier. The secondary receptacle can accept both the inductive power and RF data if implemented and may have the voltage conditioning circuit embedded within it or it may be provided as a separate entity. Conditioned power and data is then provided to the soldier system.

A further embodiment may include the provision of Radio Frequency (RF) or Near Field Communication (NFC) transmit and receive circuit modules and antennas in each of the charger housing and dongle allowing the transmission of wireless voice and data communication between the vehicle and the soldier at the same time as wireless power transfer is occurring.

Although the primary application of the invention described herein refers to a military application, the invention also has utility in civilian garments such as those used by police and fire agencies, sportsmen, etc. The reference to soldier discussed herein is intended to collectively refer to all users, including military and non-military. The system may for example be used on a personal-us vehicle such as a snow-mobile, ATV, motorcycle, etc. The system may also have space travel application. A space suit can be fitted with the inductive dongle allowing a central battery that may power tools, video or voice communication systems and even life support equipment. A significant advantage of an inductive power and data coupler is that it is intrinsically safe and does not generate an electrical connection arc allowing its use in a potentially explosive high oxygen environment as may occur from time to time, for example in a space station, jet fighter aircraft, submarine, or other vessels or vehicles (collectively referred to herein as vehicles).

Charging Socket

To prevent the inductive charging system from being a constant power draw on the vehicle electrical system, an inductive polling processor maintains the main drive coil in stand-by mode until a vest dongle is placed into the charging receptacle or socket (collectively herein a receptacle) of the primary power unit. A proper response via inductive communication from the secondary inductive charging circuit after it is polled is required before the primary transmitter will turn the main charge power on. This routine both reduces power usage when a secondary dongle is not in the primary power unit and protects the system from being turned on without a proper power receiving load and being potentially damaged by foreign objects if they were to be inserted into the receptacle. Alternate methods of sensing a dongles presence within the charger are proximity circuits such as hall effect sensors and mechanical switches.

When a soldier enters a vehicle for the purposes of the present invention it is assumed he or she will be in the vehicle for only a short period of time. To provide as much charge as possible to the soldier system central battery in a short time period requires that the battery be fast charged, which depending on the battery chemistry or mechanical design may be a charge rate from as low as 0.5 C to 2 C or higher. The maximum charge rate for Lithium chemistry batteries may also be determined by the battery charging circuit and the battery protection module or sub-circuit and the safety mechanism that are used to protect the battery. For example a battery can be charged at a higher C-rate if the battery management or protection module protects against over-voltage, over-current, short circuit, over temperature and provides cell balancing. As with any battery charging system regardless of battery chemistry, once the soldier's central battery is fully charged, the wireless inductive charger will step down into a reduced charge mode until it is placed in a trickle charge maintenance mode. Wireless chargers that are placed in areas where it may be anticipated that components of the charging system, for example a garment housing a dongle, will be stored for longer periods of time such as in a locker or barracks charging location for example, then the charger can be configured to operate either as a fast charger or as a conditioning charger where the battery could be completely discharged before it is recharged at a lower charge rate.

As future soldier systems with very fast charge rate power sources such as super-capacitor banks are further developed, the primary and secondary circuits of the inductive wireless charging system can be modified to accommodate the control circuits and output voltages required for the newer technology.

When at a forward operating base or barrack the central battery on the garment and any distributed devices for example in pockets attached to the battery or power manager, can be charged by placing the dongle into a charging mounting portion powered from AC mains.

As the term is used herein, a mounting portion of the system in the above embodiment includes the receptacle, so that the dongle mates into the mounting position, that is, into the receptacle. The term receptacle is intended to refer to the female recipient in a male/female mating arrangement between the receptacle and the dongle, and thus depending on the shape and size of the dongle may take various forms, may be of various sizes, and may or may not be integrated with various structured elements of a vehicle, a seat belt, subject to the advantageous alignments embodiments discussed herein and for ease of engagement and disengagement of the dongle and mounting portion, as so as to minimize instances of unintended disengagement between the dongle and the mounting portion.

Primary Drive Circuit

Figure 10:
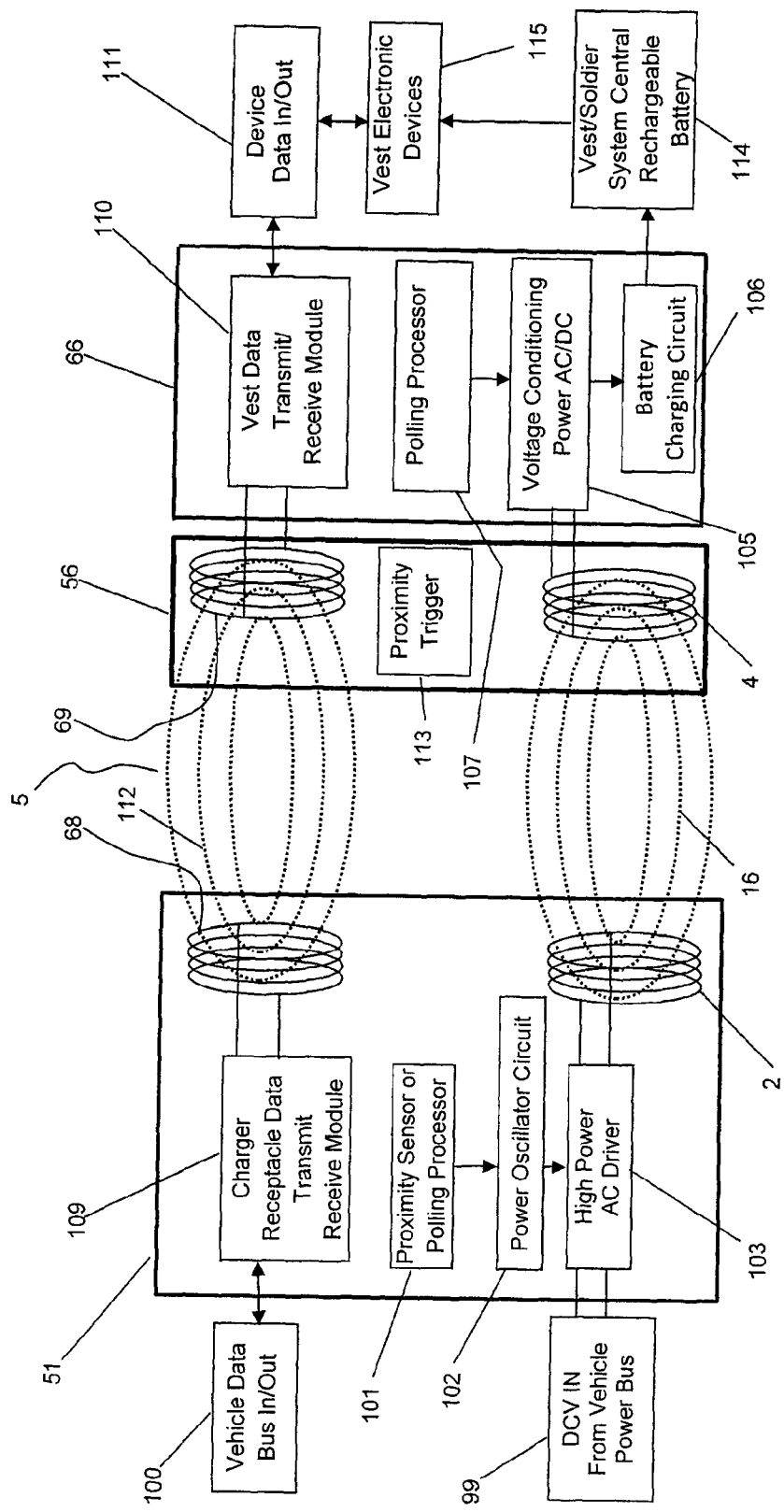
FIG. 10. Schematic block diagram showing primary side inductive power transmission sub-system and NFC or RF communication data driver/receiver sub-system within primary seat power module. The vest dongle contains secondary side inductive power receiver and NFC or RF communication data transmit/receive module and communications data antenna.

A primary high power resonant tank (LC) circuit that contains the primary inductive coil assembly is coupled by an alternating magnetic field to a secondary inductive coil and associated circuits. The primary circuit electronics comprise both control and inductive resonant circuits. The primary side would typically include but not be limited to a frequency generating or oscillator circuit, power switching driver(s) such as a MOSFET full or half bridge driver that in turn would power the LC resonant tank circuit placing a current through the primary coil and with the option of a feedback loop to maintain optimal resonant frequencies (FIG. 10). Base power for the primary circuit would be provided from the main DC power bus of the vehicle. Alternate drive circuits that generate an AC magnetic field that may be used include resonant and non-resonant circuits such as LLC, LCC architectures.

The primary circuit may be tuned to a single frequency i.e. 200 kHz or be an auto tune circuit that maintains resonance over a small range of frequencies as external factors and the location of the secondary coil dictate. Many topologies or architectures of this circuit can be constructed depending on the needs identified or specific design requirements that accommodate different frequencies, impedance, inductance and capacitance of the major components. The resonant frequency of this device would typically be selected within the range of 80-500 kHz, but certain applications may require operation into the 10's of MHz. The resonant characteristics of the tank circuit will change as the distance between the primary and secondary coil distance changes due to the mutual inductance of the primary and secondary coils changing, which in turn changes the apparent inductance of the primary coil and so changes the resonant frequency of the drive circuit. The primary inductive resonant circuit may therefore be auto-tuned to work at predetermined operating distance so as to obtain optimal performance. In many inductive power charging applications the primary drive circuit is co-located with the primary drive coil such as at the primary charging receptacle, however the primary circuit may also be a short distance (eg. 10-50 cm) from the receptacle on the floor, seat frame or other vehicle structure, with a shielded cable connecting the primary coil to the primary drive circuit.

Advantageously, through shielding and appropriate circuit design, the primary circuit will not cause disruptive EMI or be susceptible to EMI.

Secondary Voltage Conditioning Circuit

The secondary voltage conditioning and charging controller circuit is located preferably within 0-50 centimeters of the secondary or receiving inductive power coil or dongle. A shielded cable conducts the received AC power from the dongle to the voltage conditioning module. The secondary voltage conditioning circuit provides rectification via a diode bridge, semi synchronous or synchronous rectification circuits of the inductive AC power signal received from the dongle; DC voltage regulation as required, and passes the DC power to either the central soldier system battery charging and control circuit or to the soldier system power manager. The battery charging circuit monitors the charge required by the battery and charges it accordingly when power is available from the primary inductive system. The primary circuit inductively interrogates the secondary circuit to firstly determine if it is present and secondly it may determine the charge status of the battery. If the battery is at full charge and does not require charging as reported by the secondary circuit, the primary circuit removes charging power and falls back into interrogate only mode.

For low power applications or those where the physical size of the dongle is not an overly restrictive criteria, the secondary voltage conditioning circuit can be placed within the dongle and DC voltage be output to the charging board or soldier system power manager.

The central battery (or batteries) of the soldier system can be of any type of rechargeable battery although a high capacity Li-Ion battery or similar is preferred due to its high energy density.

Proximity Detector

As previously mentioned, one method of providing for a more energy efficient operation of the charging system is for the primary drive circuit to include a low power proximity sensing circuit. The sensing circuit may for example be inductive, capacitive or a hall-effect sensor located within the charging receptacle that senses a trigger device or component such as a magnet embedded within the dongle. A further example is a mechanical switch embedded within the charging receptacle that is only switched by the presence of the dongle within the receptacle.

Instead of a hardware or mechanical device being used as the secondary circuit proximity detector, the primary power circuit can be used to 'look' for the secondary circuit. Many circuit options are available, one is that the auto tune circuit looks for a change in the inductance of primary coil. As the secondary coil is brought into proximity, its mutual inductance as it couples with the primary coil changes the inductance of primary coil. This can be detected by the auto-tune circuit of the primary coil. A second example is that the primary coil drive circuit would poll for the presence of a secondary circuit on a regular basis with an acknowledgement using a modulated inductive response sent back from the secondary circuit.

Primary and Secondary Coil Configuration

The placement, orientation and geometries of the primary inductive coil assembly and secondary inductive dongle ferrite or coil assembly may be designed and constructed in multiple configurations that provide similar results as discussed below.

The benefit of placing the primary and secondary inductive coils on ferrite transformer cores is that when the cores are placed adjacent to each other, the induced magnetic field path is a closed circuit within the two core halves, providing enhanced coil coupling and low stray or residual magnetic flux. The air gap between the legs of opposing coils which is the air gap in the magnetic circuit can be varied considerably and in so doing change the permeability of the magnetic path and the apparent inductance of the coils placed on the ferrite components. The width of the air gap influences the operating characteristics of the magnetic circuit and the coils such as preferred operating frequency and bandwidth, Q the quality factor, stray magnetic fields and system EMI at the air gap etc. An important attribute of the air gap between ferrite components is that it can reduce the susceptibility of the ferrite cores to saturate under high current loads which also keeps the operating temperature of the magnetic circuit lower.

The ferrite cores and windings as previously mentioned may be in many configurations as illustrated by way of example in FIGS. 1A-1F. The primary core and winding may be of a cylindrical form and the secondary core and winding may also be of a cylindrical form. The secondary dongle coil assembly is inserted into the inner diameter of the cylindrical primary coil assembly or receptacle of the primary power unit. The secondary coil winding may be wound around a ferrite core, rod, bobbin or other ferrite geometry and formers that have a cylindrical form factor but whose section may be circular, hexagonal or other multi-sided form that allows the magnetic field or flux to be guided, shaped or otherwise manipulated.

Other typical core shapes include E series such as E, ER, EFD, ETD, EP-cores; U or C core, pot cores such as PT, PTS, PM, RM, P/I; planar cores as simple circles with or without an annular opening, planar E-series or rods placed parallel to each other. One of many alternate configurations is that the primary winding may be wound around the center of the core or in the case of an E-core the center pole or leg or even each of the three legs of the E-core. The secondary coil assembly having a principally matching core geometry (a matching core pair set) is placed with its pole face against or adjacent to the pole face of the primary core and coil to create a tightly coupled transformer with a closed magnetic path. Depending on the geometry of the ferrite cores utilised and mechanical design requirements, the core can be placed in a vertical orientation, a horizontal orientation or any other suitable orientation.

A pot core with a solid center pole and outer shell may be used to support both the primary and secondary windings. The pot core can also be placed in any orientation that allows the poles of the core halves to be placed in close proximity. A benefit of a pot core ferrite structures is that the outer shell more completely encases the primary and secondary winding and for the most part reduces eliminates any radiated energy such as EMI or stray magnetic flux.

The optimal core configuration from a magnetic path, efficiency of coupling and lowest production of stray magnetic flux perspective, are two pot core coil halves. The pot core however suffers from a less desirable cubic geometric form as a dongle. A part measure reduction to solve this problem although still bulky is the use of an RM design core. The cylindrical bobbin and outer shell offers a potentially optimal mechanical configuration for the dongle as the bobbin is long and slender and no alignment within the charger housing is required. However, this core configuration has poor coupling efficiency and produces high axial stray magnetic flux. A compromise stock shape core is the E-core series as it has excellent coupling, low stray magnetic flux, a geometric form that is principally elongate with acceptable cross-section for ease of one-handed manipulation of the dongle, and can be designed to handle high power levels. Custom core shapes may also be designed, for example a modified RM core with the addition of an elongated or elliptical outer shell that is tapered at the ends would provide the shielding and coupling benefits of a pot core but with reduced bulk.

The two ferrite or magnetic core assemblies comprising the inductive transformer may be symmetrical or non-symmetrical and have similar or dissimilar winding formats. An advantage afforded by the application of an elongated ferrite profile such as a U or E-core is that the pole faces are not sensitive to mis-alignment in the longitudinal direction, that is the direction of dongle insertion and extraction, and may be displaced by as much as half their length and remain substantially coupled versus for example a pot core, U or E core that is not of an elongated design and is sensitive to displacement.

The material type of the core and core dimensions are determined by the operating frequency of the inductive circuit and the current handling requirements of the coil and core assembly. Many core or magnetic path materials can be used, such as powdered ferrite, soft iron, laminated steel, silicon-aluminum-iron (Kool-Mu™).

The coil winding may be configured in a single, dual or multiple layer wrap and be selected from many types of conductive elements such as solid copper with bondable or non-bondable varnish, or be a Litz wire. The coil windings may also be fabricated from flexible printed circuit materials. The turns ratio of the primary to secondary coil windings may be equal or be constructed so as to provide a decrease or increase in the number of turns relative to each other.

To avoid heating during high power transfer, which may lead to over-heating of the coils, the direct current resistance (DCR) of the coils is kept low. Notwithstanding the advantage and constraints which lead to a low profile design referred to above, applicant has determined that a low profile may still be attained while maintaining low DCR, for example by decreasing the number of windings in the coil. The higher the power transfer, a lower DCR is preferred. For the sake of defining what is meant herein by high power transfer, in applicant's experience a low power transfer, such as attained in applicant's inductive power transfer garments referred to in the background above, may attain 25 Watts. As used herein then, a high power transfer is approximately at least twice the low power transfer, and thus approximately at least 50 Watts. At 25 Watts, applicant has determined that a DCR to avoid heating is no greater than substantially 0.3 Ohms. At 50 Watts, the DCR should be no greater than substantially 0.22 Ohms. At 75 Watts, the DCR should be no greater than substantially 0.16 Ohms. At 100 Watts, the DCR should be no greater than substantially 0.12 Ohms. In testing coil designs, applicant has determined that effectively low DCR's may be obtained for high power transfer while still maintaining low coil profiles effective for the use in a dongle receptacle inductive power transfer system. Put another way, sufficiently high power transfer has been achieved, for useful fast charging of a soldier system central battery and electronic peripherals using inductive coupling alone, using low profile coils (and associated electronics) that fit within the weight, shape and size constraints associated with light-weight soldier portable equipment such as by way of example the dongle and receptacles or mounting portions of the system as illustrated.

Comparative magnetic field (H-Field) measurements were made to validate that the dongle system wireless power transfer produced lower levels of stray magnetic versus that of the large diameter planar coils. Both the primary and secondary planar coils had ferrite backing and a coil separation distance of 1.0", as would be expected in normal use. Measurements were performed using a Lindgren Magnetic (H-Field) Near Field probe with a nominal power transfer level for both system of 20 watts. The probes were placed at a distance of 5 cm from the outer perimeter centred between the two planes of the coils. The dongle primary housing had a 0.060" (1.5 mm) aluminum housing which provided both primary shielding and a means to attach the housing to a structure. For the dongle system measurements, the probe was placed at a distance of 5 cm from the 3 mm air gap of the opposed pole faces of the E-core primary and secondary ferrite cores. The magnetic field was scanned from 3 KHz to 300 Mhz, with the peak amplitude for the planar coils occurring at the fundamental resonant frequency of 150 kHz and for the dongle at the resonant frequency of 116 kHz. For the planar coils an H-Field amplitude of 152 dBµV/m was obtained, while for the dongle system a measurement of 126 dBµV/m was obtained, a differential of 26 dBµV/m or expressed as an amplitude ratio, a reduction in stray magnetic field strength of twenty times. To further reduce the stray field, ferrite tile can be added to the sides of the receptacle housing.

Housings

A significant benefit of an inductive charging system is that it can be fully encapsulated and completely sealed against water, dust, ice, snow and POL's. An inductive power transfer or charging system will still operate at its design efficiency when fully submersed, enabling energy transfer to a soldier system and allowing its use at all times, in any environment, inside or outside of the vehicle. This allows the inductive charger to be used for example in the interior of an LAV, topside of an open troop carrier, or the open deck of a small patrol boat.

Figure 5:
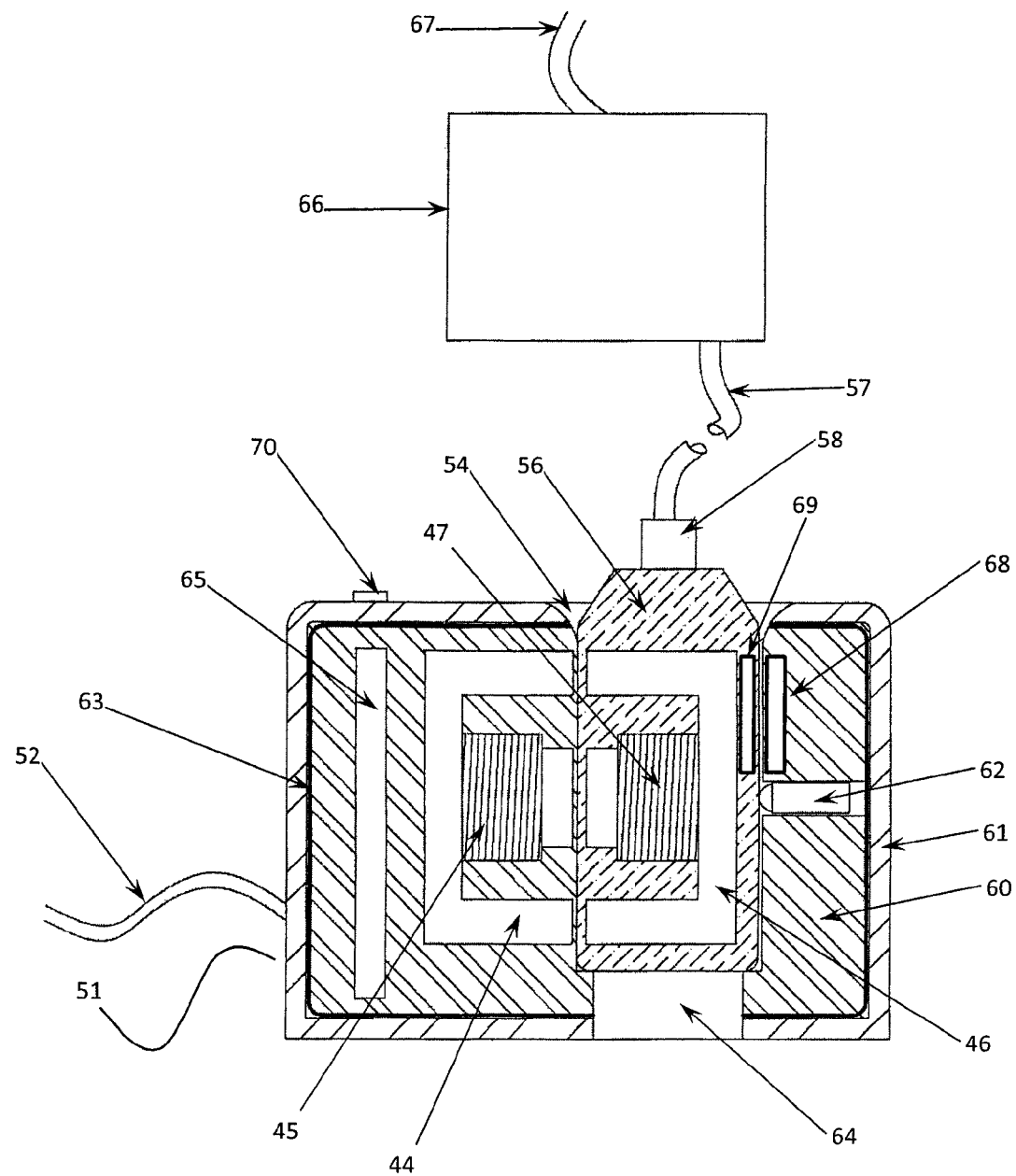
FIG. 5. Cross-section of wireless charging vest dongle located in receptacle of seat inductive power unit.

The primary power or charging housing can be constructed from any non-magnetic or non-conductive material such as plastic, re-enforced plastic, resins or composites as the encapsulation media for the main drive circuit and to form the outer perimeter or physical surround of the mounting portion of the system such as a dongle receptacle. The outside of the housing may be clad with metal such as aluminum or steel sheet or other suitable materials to provide the primary charge housing with both a robust outer shell and to provide a level of primary external shielding. The housing may further incorporate a secondary internal EMI shield layer using materials such as ferrite tile, Mu Metal or Hypershield™. The housing is constructed such that is environmentally sealed, ie, environmental proof (waterproof, etc.) and so that the umbilical cable entry into the housing is waterproof such that the entire housing is submersible and, for military use, can withstand the broad range of environmental hazards associated with military use to standards such as MIL STD 810F. The primary power unit housing contains the primary inductive drive circuit, the primary inductive core and coil assembly which is positioned in close proximity to the dongle receptacle and if required the NFC and RF transmit/receive circuit module and antenna (FIG. 5).

The dongle and secondary conditioning electronics are also fully enclosed in an environmental proof housing. The dongle may be injection molded plastic or be encapsulated in a resin or plastic media and is fitted with a waterproof cable entry. The secondary inductive power coil assembly and the voice and data communication RF circuit and antennas can be packaged within the small profile of the dongle. When the dongle is inserted into the receptacle of the primary power unit the shielding provided by the primary housing reduces the RF signal radiated outside of the housing.

The primary charger housing is designed in one preferred embodiment such that the dongle is a slip fit into the receptacle of the primary charger. The charger and the dongle maybe mechanically keyed so that the dongle can only be inserted into the receptacle in one orientation, to ensure the ends of the ferrite cores face each other and a closed magnetic path or inductive transformer loop is created. Multiple methods of creating a keyed dongle are available, four of which are shown in FIGS. 8A to 8D. The plastic housing or encapsulation around the ferrite core pole faces in both the dongle and the primary charger housing can be designed to be of different thicknesses ranging from 0 to 10 mm of total separation and serves as the air gap spacing between the ferrite cores. When the dongle is a loose fit within the primary power unit receptacle, the inductive power circuit can be designed so that it functions with a gap variation range of for example 1-5 mm. Alternatively the primary housing can incorporate a positive pull-away latching device such as a spring loaded plunger or pad, a leaf spring or elastomeric cushion that pushes the dongle and primary charger ferrite mating faces together so there is no air gap between the dongle and the housing, which in turn means no variance in air gap between the pole faces of the ferrite core halves.

The primary power receptacle can be placed at any angle that facilitates the insertion and removal of the dongle without causing any untoward strain on either the dongle cable or the soldier. The receptacle may have a pull-away alignment mechanism. For example it may be mounted on a pivoting or sprung or elastomer base that allows it to move freely without the risk of binding, and align in the direction of stress (for example, about any or all three axis of rotation) when the dongle is withdrawn at an angle other than intended. This may occur if a soldier instead of standing straight up when leaving his seat or other supporting structure, stands up or rolls off with a twisting or angular motion, or in a rearward direction, etc.

A magnet may be placed in the receptacle or the secondary dongle to provide a retention force between the dongle and the receptacle to assist with maintaining dongle location, which provides another form of positive pull-away latching, without intending to be limiting.

To prevent the accumulation of dirt, snow or other physical contaminants such as a small rock within the charging receptacle that may prevent the primary and secondary coils from having other than optimal alignment, the receptacle can be designed with at least one debris passageway or chute for example in the center or in the sides of the base of the receptacle. The passageway(s) allows dirt to simply fall, be pushed or be washed through the receptacle without it accumulating. Any ice that may accumulate on the dongle housing during outdoor winter use can be pushed through the receptacle versus having to scoop, scrape or otherwise remove it.

LED charge status indicators may be placed on the charger housing to provide an indication of the charge of the central battery.

When the soldier leaves the vehicle the dongle maybe stowed within a pouch on the vest for embodiments where the dongle has a tapered shape the tapered shape of the dongle provides that if it is not stowed properly, it will be less likely to catch or snag on anything.

As previously described, mechanical configuration or system mechanics may be reversed where the dongle is the primary and the receptacle the secondary. In this reversed configuration, the primary dongle is attached to the primary inductive drive circuit via an umbilical cable and would remain in the vehicle when the soldier leaves his seat, with the secondary receptacle contained for example as a small pocket as part of the soldiers load carriage. On leaving the vehicle, the soldier removes the dongle from secondary receptacle and has no further parts that are required to be stowed on his soldier system.

Data Transmission

The provision of wireless video, image, text and voice transmission to a soldier when he is an occupant of a vehicle becomes an important asset when the soldier is about to egress the vehicle. Previous field trial attempts to connect the soldier to a vehicle through conventional cable connectors have not been sufficiently successful to warrant system wide implementation. A primary cause of failure for the conventional cable connectors is contact pin bending, breakage or inability to connect due to environmental contamination. Currently without a data connection, when a soldier arrives at a waypoint in a windowless armoured crew transport vehicle, he does not have a visual of the situation he will be entering into until the moment he steps out of the vehicle, at which time he must instantly absorb the situation around him. As his GPS does not work within the vehicle, if he is to head in a certain direction upon exiting the vehicle, he must wait several minutes for his GPS system to re-acquire a signal so that he can become oriented. During night time missions, a soldiers orientation problem is compounded by darkness and the inability to see distant features even if wearing night vision.

When wireless data in addition to wireless power is provided via the same piece of equipment, the soldier gains significant situational awareness while within the confines of a vehicle. Audio connection allows him to listen to the vehicle crew and any detailed instructions they may have. A live video feed can be provided that allows the soldier to see what the vehicles outside video cameras (daytime or night time thermal) are transmitting. Image data allows the soldier to receive map information of where he is to be deployed. Data downloads allow the soldiers GPS and Blue Force tracker (friend or foe battlefield identifier) system to be kept up to date using the vehicles GPS and informatics system, so that he has a data buffer on exiting the vehicle until his system can update. All of this capability can be provided to the soldier system using a fully shielded wireless inductive power and RF data transfer system.

Near Field Communication (NFC) and Bluetooth RF communication maybe used in conjunction to enable rapid pairing of devices without manual intervention using NFC communication and pairing protocols, with the NFC system handing off to Bluetooth RF or wifi modules for the high speed transmission of voice and data.

The small size of both NFC and Bluetooth transmit receive modules and the use of printed circuit or chip antennas allows these circuits to be embedded within the dongle. As the inductive power transfer can be designed to operate at frequencies of under 500 kHz, NFC's fundamental frequency is 13.56 Mhz and Bluetooth systems operate in the range of 2400-2483.5 MHz, and wifi operates at 2.4 Ghz or 5 Ghz, allowing all four wireless technologies to co-exist and function within the same device. Other RF technologies such as Zigbee™ may also work.

The very close proximity of less than 0.1-2 centimeters for the RF transmit and receive antenna of the dongle and primary charge housing allow low power RF transmission to be utilised and in addition the shielding provided by the housing provides a secure operational environment with little to no opportunity for device cross-talk.

Detailed Description with Reference to the Figures

Figure 1A:
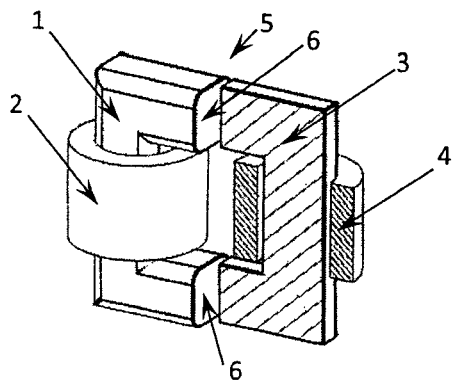
FIG. 1. Selected examples of ferrite core profiles or geometries that can be utilised in the construction of an inductive dongle vest charging system. The ferrite profiles can be aligned vertically or horizontally depending on the mechanical and magnetic design of the dongle—receptacle charging components.
Figure 1B:
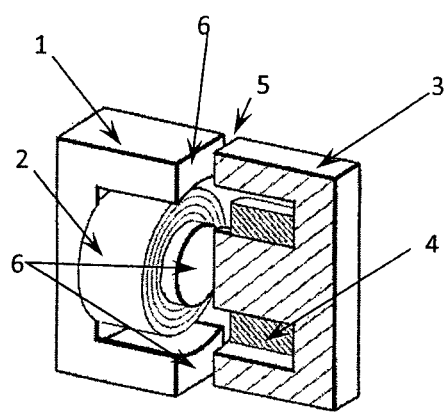
Figure 1C:
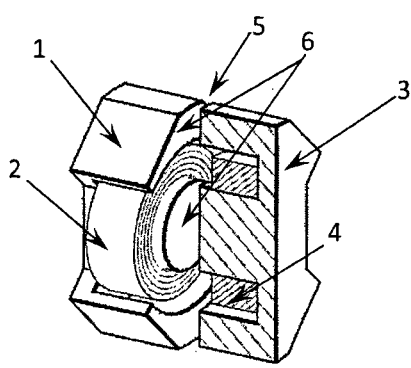
Figure 1D:
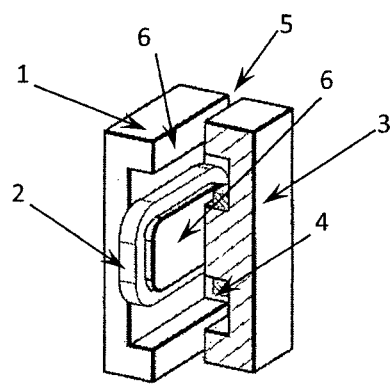
Figure 1E:
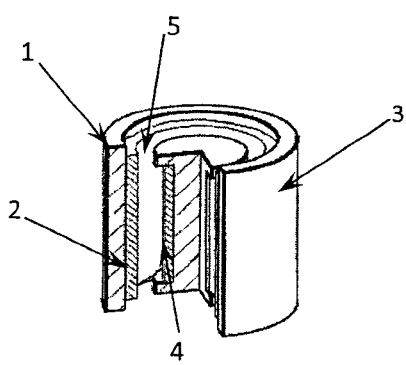
Figure 1F:
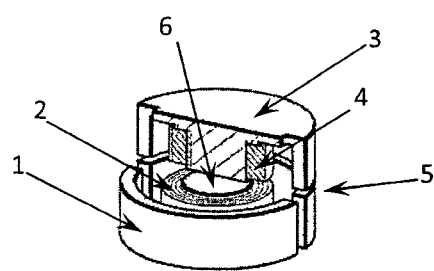

FIGS. 1A through 1F illustrate various ferrite core profiles that could be employed as the transformer ferrite cores in a wireless power transfer system. FIG. 1A depicts a pair of U-cores, FIG. 1B a pair of E or ETD-cores, FIG. 1C a pair of RM cores, FIG. 1D represents a pair of planar E-cores, FIG. 1E an outer cylinder with an inner rod or bobbin and, FIG. 1F a pair of pot cores. Regardless of the ferrite profile, the air core transformer is comprised of a primary ferrite core 1 with a primary inductive coil winding 2, a secondary ferrite core 3 with a secondary inductive coil winding 4. The primary and secondary cores are separated by a gap 5 that is nominally called an air gap and that can also filled with any non-metallic, non-magnetic material such as plastic, fabric, composite materials etcetera. When the primary coil is energized with an alternating current, a magnetic field is produced such that magnetic flux is emitted from the ferrite core pole faces 6 allowing magnetic or inductive coupling to a secondary ferrite core and winding. Two coil windings could also be placed adjacent to or within each other without utilising ferrite cores, however the magnetic coupling and resulting electrical efficiency would be much less as the magnetic field would not be contained within the ferrite core and would be omni-directional. The ferrite shapes may have an elongated form versus the profiles shown and any of the geometric proportions can be varied. Other shapes and configurations can also be utilised including a primary ferrite that is of a different shape than the secondary, for example the primary ferrite may be a U-core and the secondary maybe a flat bar or I-core or the primary/secondary maybe two parallel I-cores.

Figure 2A:
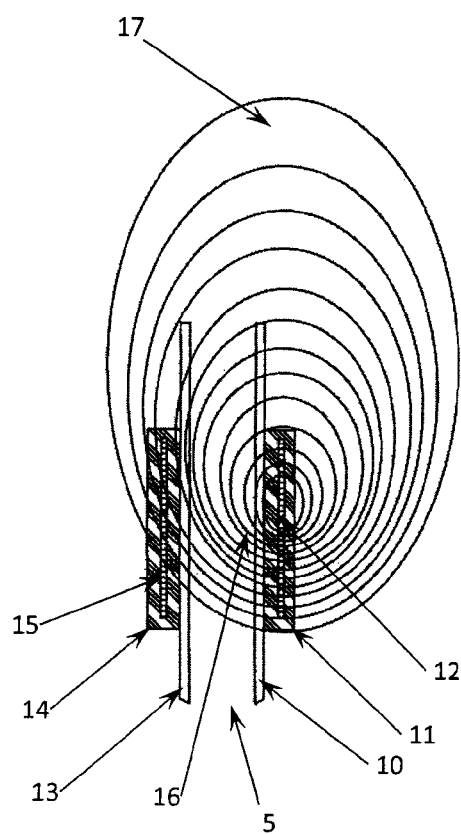
FIG. 2. Illustration showing in FIG. 2A one half of a cross-section through an inductive planar coil seat charging system (Soar Patent) assembly. Inductive coupling is exhibited between the primary and secondary coils, with in addition the generation of magnetic radiation into free space. With the addition of ferrite material backing to both the primary and secondary coils, a stronger inductive coupling is produced between the magnetic coils and the magnetic radiation into free space is reduced.
Figure 2B:
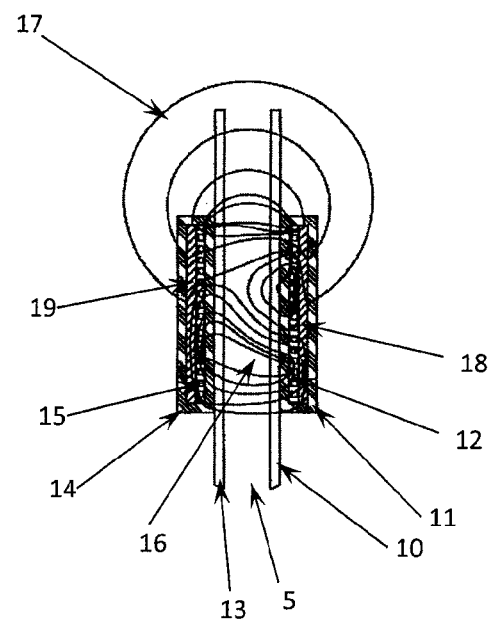

FIG. 2A and FIG. 2B are illustrations of a large planar coil seat to vest wireless power transfer system as described by Soar in his U.S. patent application Ser. No. 12/923,594 entitled Vehicle Seat Inductive Charger and Data Transmitter. In this system a large diameter planar coil assembly is placed in the back of a seat with a matching larger diameter coil placed in the back of a users vest or garment. In FIG. 2A, the primary planar coil winding 12 in an environmental encapsulation 11 is place behind a seat back 10 typically made from fabric, plastic or similar non-magnetic or non-metallic material. A secondary planar coil winding 15 also within an environmental encapsulation 14 is located behind the outer fabric layer 13 of a garment such as a tactical vest. When the primary coil 12 is energized with an alternating current it produces an alternating magnetic field 16 allowing it to inductively couple and wirelessly transmit power across an air gap 5 to a proximally located secondary coil. The magnetic field 16 produced by the primary coil is omni-directional and produces high levels of stray magnetic field, i.e. magnetic field that does not couple with the secondary coil. To improve the magnetic or inductive coupling a primary ferrite backing can be placed behind the primary coil 18 and secondary ferrite backing 19 behind the secondary coil. The ferrite backing provides direction to the magnetic field improving the inductive coupling and reducing the stray magnetic field 17. The problem with this system is that as the soldier moves around in his seat and the coupling distance between the coils increase, the inductive coupling efficiency decreases or is completely interrupted and the stray magnetic field increases. When the coil separation distance is increased due to the soldier wearing a backpack when seated the utility of the coils is inhibited. In addition, the coils are large and difficult to integrate into the existing systems.

FIGS. 3A and 3B present two different transformer core configurations showing the magnetic flux lines 36 for a primary 31 and secondary 33 E-Core ferrites and their respective coil windings 32,34.

FIG. 3A shows a pair of E-core ferrites 30 whose pole faces are in intimate contact such as in a conventional power transformer. When a magnetic field is produced by an energized primary coil 32, the magnetic flux follows the magnetic path created by the ferrite profiles, crossing between the pole faces with essentially no stray magnetic flux created.

FIG. 3B shows a pair of E-cores forming an air-core transformer 40 with a small air gap 35 of between 1-4 mm between the three ferrite pole faces as may be used in the wireless inductive dongle power transfer system. When the magnetic flux produced by an energized primary coil bridges the air gap 35, it produces a small amount of stray magnetic flux 37, however substantially all of the magnetic flux is inductively transferred between the cores. For the same level of power transfer, minimal stray magnetic field is emitted from air gap versus large planar coils. The E-core profiles shown are schematically representative of all ferrite core types and profiles.

Figure 4A:
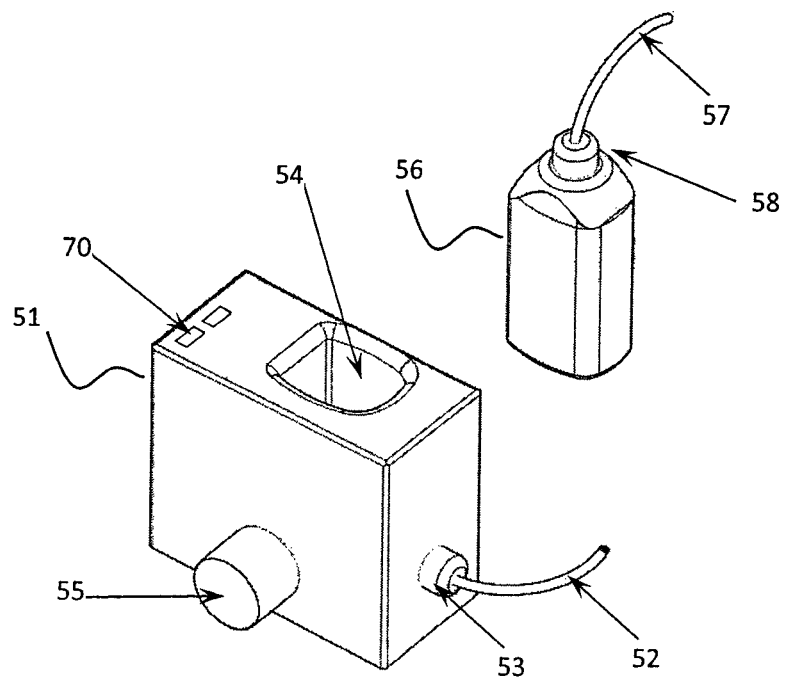
FIG. 4. Illustration in FIG. 4A of inductive vest charging dongle and seat power unit with wireless charging receptacle.
FIG. 4B shows dongle placed in the primary charging unit which is attached to seat rail or other mounting structure.
Figure 4B:
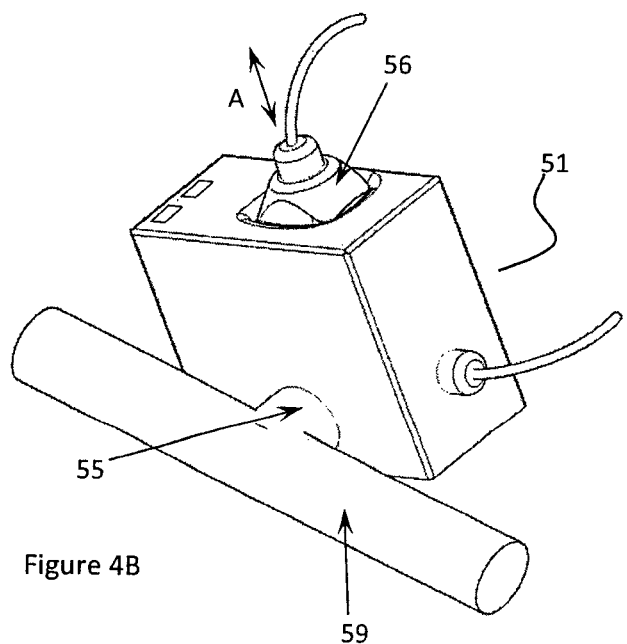

One representation of a dongle-receptacle style seat to garment inductive power transfer system is shown in FIGS. 4A and 4B. FIG. 4A shows one embodiment in which the primary inductive housing 51 receives the secondary dongle 56 in male/female mating engagement is inserted to obtain wireless inductive power transfer without the use of electrical contacts. An umbilical cable 57 exits the dongle through a water and dustproof cable seal 58 and connects to the secondary voltage conditioning circuit. The environmentally sealed primary charging housing assembly 51 has an integrated receptacle 54 into which the dongle 56 is inserted or removed in direction A. A cable 52 from the vehicle power and data bus connects to the primary inductive housing via a watertight and dustproof cable entry 53. Status indicators 70 may be provided to enable the user to see what mode of operation the system is in. An attachment device 55 such as a rigid or pivotable shaft, or ball, resilient, or other joining or other form of rigid or movable (pivot, rotate in multiple axes of rotation, etc.) coupling (herein collectively also referred to as a coupling) provides a means to mount the primary housing to a seat frame or other structure 59, and allows the primary housing to pivot or swivel to allow the dongle to be easily inserted or withdrawn. The attachment device coupling may also be sprung, hinged, elastomeric or use other means to allow it to align with the dongle withdrawal direction and trajectory, and facilitates dongle withdrawal even at an acute withdrawal angle. FIG. 4B illustrates the primary inductive housing attached to a seat member or structural support 59, with the dongle inserted into the primary receptacle and able to receive power.

A cross-sectional view of one embodiment of a dongle wireless power system is shown in FIG. 5. The primary inductive housing 51 contains the primary ferrite 44 shown as an E-Core profile with primary coil winding 45 that is connected to the primary inductive power drive circuit 65, the drive circuit is in turn connected to the vehicle power and data bus via a cable 52. The outer structural mounting case 61 for the primary housing, maybe made from any robust material such as for example, reinforced plastics, composites or metal. An inner shielding layer 63 maybe metallic such as copper, aluminum or Mu metal; rigid or flexible ferrite materials such as HyperShield™ etc. and would be used to limit propagation of any stray magnetic or RF data signals. The internal construction of the primary housing would be from plastic resin or composite materials that provide an environmental and vibration resistant encapsulation 60 for the primary drive circuit and coil and allows inductive coupling between the primary and secondary dongle coil assembly. Typically the plastic encapsulation would be one to two millimeters thick at the both the pole face of the primary ferrite and the pole face of the dongle to minimize the thickness of the air gap and to maximize magnetic coupling and power transfer efficiency. To initiate the inductive transfer of power, the dongle 56 is placed into the receptacle 54 of the primary housing.

The dongle is sensed by the primary transmitter circuit either through inductive polling or pinging of the secondary coil or by using a proximity sense circuit such as a hall effect sensor and a magnet trigger. The secondary pole face of the dongle maybe held in close proximity to the pole face of the primary through the application of a dongle retention and positive force pull-away latching device 62 such as a spring loaded plunger which holds the dongle ferrite core pole face against the charger ferrite core pole face and provides adjustable retention force to keep the dongle in an optimal charging location within primary power housing. The retention and latching device 62 may be any of several mechanical configurations such as a compression spring, leaf spring or magnetic etcetera. A through-hole or passageway 64 at the bottom of the receptacle prevents any environmental debris, ice or snow from collecting in the housing and impeding insertion of the dongle. When the dongle is inserted into the housing, indicators 70 provide a means of informing the user on the status of the power transfer. The dongle housing 56 environmentally encapsulates the secondary ferrite profile 46 and secondary inductive coil winding 47, which connects to the secondary voltage conditioning circuit also placed within an environmentally robust housing 66 via a cable 57, which exits the dongle through a watertight and dustproof cable entry 58 that also provides a cable strain relief. The secondary voltage conditioning circuit receives AC power from the secondary inductive coil and provides DC electric power to the soldier system via an output cable 67. There is the also the option of placing the secondary voltage conditioning circuit within the dongle so that a DC voltage output is produced directly from the dongle. If a wireless data connection is required between the vehicle and the soldier, the dongle can be equipped with a WiFi, Bluetooth, ZigBee or other type of RF module 69 or an NFC module to transmit/receive data from a similar module 68 in the primary housing. As the dongle is in such intimate proximity to the primary housing the RF transmission can be of very low power, yet provide by utilising the correct module (for example WiFi IEEE802.11n or 802.11ac) streaming video, graphic images, text and audio information exchange between the soldier and the vehicle.

Figure 6:
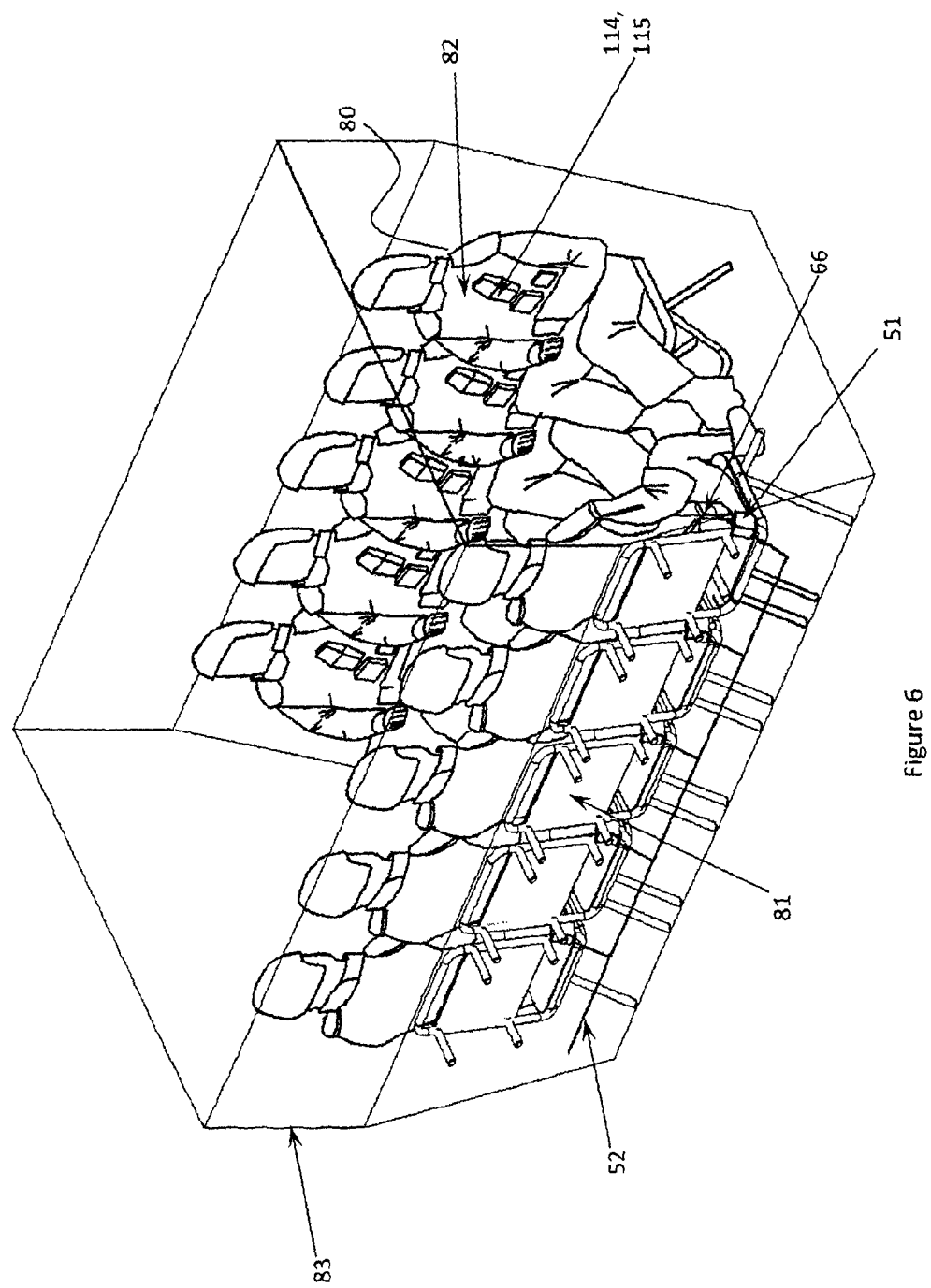
FIG. 6. Example troop seat configuration inside an armoured vehicle with each seat connected to the vehicle power and data bus and provided with a seat inductive power unit to provide wireless power and data transfer to the charging dongle on the soldier vest. Power and data received by the dongle are provided to the vests power system and communications and computing system.

FIG. 6 is an illustration of a representative close quarter crew seating arrangement in a military vehicle 83. The primary inductive housing 51 is mounted towards the rear of each vehicle seat 81 adjacent the soldier's hip when seated, and is connected to the vehicle power and data bus via a cable 52. In this embodiment, when a soldier 80 sits in the seat, the dongle on its umbilical cable is placed by the soldier into primary housing receptacle. The AC wireless power and data received by the dongle is conducted through the umbilical cable to the voltage conditioning unit 66, which in turn provides DC power and data to the soldier system central rechargeable battery 114 and electronic devices 115 which for example may be integrated into or attached to the soldiers vest or other garments 82 broadly defined herein as any removable article or item worn by a soldier (clothing, boots, gloves, helmet, etc.).

Figure 7:
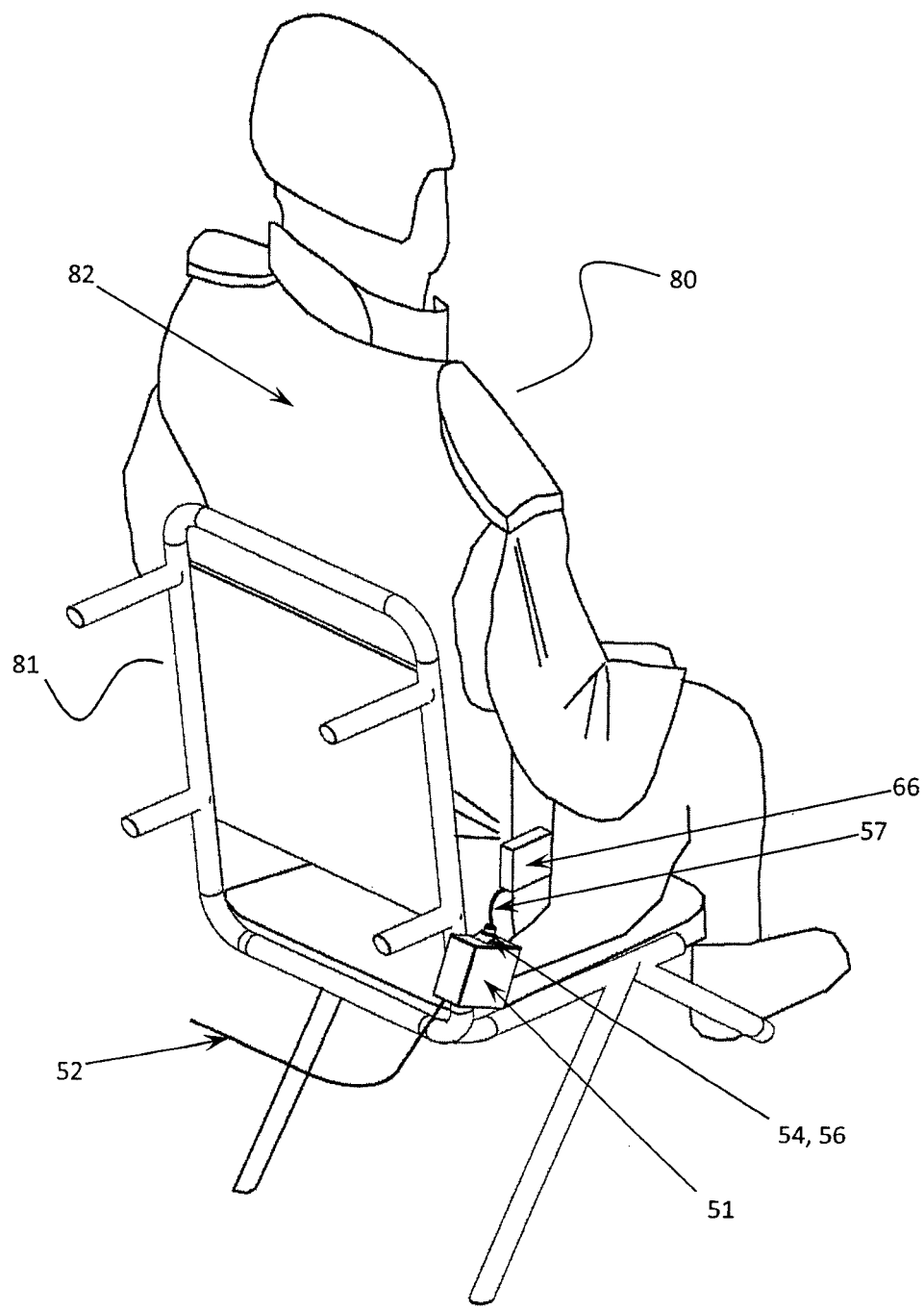
FIG. 7. Soldier wearing a tactical garment with integrated solider system (not shown) that maybe comprised of for example a rechargeable central battery or batteries and power data manager and electronic devices, sitting in a seat equipped with a seat primary power unit to provide wireless inductive power to a receiving dongle attached to the vests power system. The dongle and seat power unit may also be equipped with the ability to transfer communications and data.

FIG. 7 depicts a closer view of the expected configuration setup for the inductive dongle power transfer system. The primary inductive housing 51 is mounted towards the rear of the vehicle seat 81, and is connected to the vehicle power and data bus via a cable 52. When a soldier 80 sits in the seat, the dongle 56 on its umbilical cable 57 is placed into primary housing receptacle 54. The AC wireless power and data received by the dongle is conducted through the umbilical cable to the voltage conditioning unit 66, which in turn provides DC power and data to the soldier system central rechargeable battery and electronic devices for example integrated into or attached to the soldiers' vest 82.

As the transfer of inductive power between the pole faces of the primary and secondary ferrites requires that the pole faces are placed opposed-facing and proximal to each other, the correct orientation of the dongle when it is placed into the primary housing receptacle is important. A typical use scenario will require a soldier to insert the dongle into the primary receptacle by feel alone, as it will be very difficult to observe the insertion given the confined quarters and equipment load carried by the soldier. To facilitate the correct orientation of the dongle into the receptacle the dongle may be keyed. FIG. 8A to 8D illustrate various keying or key-way options available by for example modifying the outer shape of the dongle so that it can only be inserted into the receptacle in one orientation. FIG. 8A shows a dongle 75 with a single protrusion key that will only fit into the receptacle 60 if it is aligned with its mating notch. Once properly inserted into the receptacle the pole face of the dongle is oriented to receive power from the primary coil 74. Other example key configurations include a double notch 76 shown in FIG. 8B, a cylindrical dongle with a flat surface 77 as the key in FIG. 8C, and in FIG. 8D a square dongle with a curved surface 78 key. Other key geometries can be envisioned and would be known to those skilled in the art. Optionally, the dongle may not be keyed when employing for example an outer cylinder and inner ferrite rod if only inductively transmitting power.

FIG. 9A and FIG. 9B illustrate a reverse mechanical configuration for the dongle inductive charging system, where the dongle contains the primary coil and core and the receptacle contains the secondary coil and ferrite core. In FIG. 9A, power and data from the vehicle power and data bus 52 is provided to the primary inductive drive circuit 85 which is attached to either the seat or an internal structure within the vehicle. The dongle 86 is the primary inductive assembly and is attached to the primary inductive drive 85 via an umbilical cable 89. The umbilical cable enters the dongle through a water and dustproof cable entry that also provides a cable strain relief 58. The dongle contains the primary ferrite profile 44, shown as an elongated U-core, and the primary inductive winding 45. Not shown for clarity, is an RF or NFC data TX/RX module integrated into the dongle. The secondary receptacle housing 88 in one embodiment has a principal orientation where the dongle receptacle 54 faces towards the rear of the seat in either a horizontal or inclined downwardly to facilitate dongle extraction when the user departs the seated position. Depending on circumstance and interface of the user to other vehicle equipment, the receptacle may have other angular orientations and locations on the user. The secondary receptacle housing contains the secondary ferrite profile 46, shown as an elongated U-core profile, with secondary inductive windings 47 connected to the secondary conditioning electronics 66 which provide DC power out to the soldier system via an electrical cable 67 or e-textile. Optionally, the secondary electronics can be remote from the secondary receptacle. Not shown for clarity is the RF or NFC data TX/RX module integrated within the receptacle and able to communicate with the communications module within the dongle. Given that the dongle maybe inserted into the receptacle when the bore of the receptacle has a downward angle, various positive-force pull-away latching may be used to provide a slight retention force to the dongle to ensure it stays within the receptacle when the user is seated, such as for example using a spring loaded plunger 62, leaf springs or other mechanical or friction means, or non-mechanical such as magnetic attraction. Magnets 87 maybe place at the end of the dongle and receptacle, or if a through receptacle hole is required, magnets may be placed along the length of the dongle and receptacle. FIG. 9B is an illustration of the primary inductive dongle located within the secondary inductive receptacle housing in its power transfer position. The secondary housing would be placed within a pocket that attaches to the users external garment or load carriage. The pocket would have an opening in its exterior cover that aligns with the secondary receptacle aperture and maybe designed to allow a small range of motion using either mechanical or resilient mounts (joints, etc.) or fabric design that allows the pocket to momentarily swivel to provide optimal pull-away alignment so as to reduce extraction force if the dongle is removed at an angle other a straight aligned pull from the receptacle.

FIG. 10 presents a schematic block diagram of wireless inductive power transmission and wireless data transmission between the primary inductive power housing and a secondary dongle. Electrical power from the vehicle bus 99 is provided to the primary inductive drive and data circuit 51. The inductive power drive is comprised of an oscillator circuit 102 which provides a switching frequency to a high power AC drive switch circuit 103. The high power drive circuit is only turned on when the proximity sensor or polling circuit 101 validates that a dongle attached to a power receiving secondary circuit is in place ready to accept transferred power. When the AC drive circuit is energized, AC power is provided to the primary inductive coil windings 2, which inductively or resonantly connects to the secondary coil windings 4 across an air gap 5 through a fluctuating magnetic field 16. The AC power received by the secondary coil windings 4 in the dongle 56 is provide to the secondary electronics module 66 where it is rectified and conditioned by the voltage conditioning circuit 105 which provides the DC voltage output to the soldier system battery or energy storage device charging circuit 106. The charging circuit maintains charge on the soldier system battery or energy storage device 114 which in turn provides electrical power to the soldier system electronic devices 115. The secondary voltage conditioning circuit 105 has a communications sub-circuit 107 that allows it to inductively communicate with the transmitter or primary oscillator circuit 102 through the inductive power coils 4, 2 using the power magnetic flux as a carrier signal to ensure that high power transfer is only kept on when a dongle is inserted in the charging receptacle. Alternately a proximity trigger such as a magnet 113, can activate a proximity sensor 101 such as a hall effect sensor that the dongle has been inserted into the receptacle.

Data from the soldier system devices maybe wirelessly transferred between the dongle 56 and the vehicle via the primary power housing 51. Data 111 produced or required by soldier system devices 115 is passed to a data transmitter—receiver module 110 that allows the data to be transmitted or received via an antenna 69 and transmitted or received wirelessly 112 by the charging receptacle via any method of wireless data communication such as Bluetooth, Wi-Fi, Zig Bee or NFC for example. The wireless data is transmitted or received by the antenna 68 integrated into primary power housing where it is processed by the wireless data module 109 for communication through to the vehicle data bus 100.

The packaging or housing configurations used as a means of holding the primary and secondary inductive coil assemblies in proximity may incorporate either passive, active or combinations of the two as retention and alignment features. A mechanically passive design may use an annular receptacle into which the dongle is inserted as described herein, which in turn may combine an active design element if a compression spring loaded plunger or leaf spring or magnet is used to assert pressure on a component surface. Likewise a linear mechanically engaged design may utilise a channel with L-shaped sides, a dovetail, keyway or similar linearly engaged surfaces that may or may not incorporate sprung or elastomeric retention devices. Alternately, a passive rotational engagement may be utilised such as ⅛ or ¼ turn mechanically engaging locks such as a bayonet mount, cam and post or partial thread may be used to engage and hold two planar surfaces in proximity and alignment. Breakaway facilities can still be incorporated into mechanical attachments, such as sprung mounts or through the use of flexible structural polymers incorporated into the design such that the durometer of the polymer would determine its yield and the subsequent breakaway force required to separate the primary and secondary inductive housing components.

FIGS. 11A-11C illustrate alternative methods of aligning housings, each with at least one planar surface, where the physical housing itself does not provide any physical retention or location assistance to the alignment of the primary and secondary inductive coils. In place of a housing that provides passive means of retention, attachment methods using more active means that are capable of a breakaway function maybe used such as for example hook and loop fasteners or surfaces, or such as attraction using magnets.

In particular, FIG. 11A shows an example configuration of two cubic housing forms being used for the primary and secondary coil assemblies. Other shapes of housings would also function, as listed by way of example. The primary inductive coil 44 shown as a pot core, receives AC inductive drive power from the primary inductive drive via the primary inductive coil cable 89 and is integrated into the primary coil housing 120 which has a cubic form with planar sides. The primary housing attaches to the secondary inductive housing using a configuration of magnets 121. The force required to break the attachment of the primary and secondary housings is determined by the strength and area of magnets used. The secondary coil assembly 46 and secondary voltage conditioning circuit 66 with DC output 67 to the soldier system are contained within a cubic or other geometric form secondary housing 66 that has alignment and attraction magnets on the appropriate planar surface. If a specific relative orientation between the primary and secondary planar surfaces is required, for example if embedded TX/RX RF data antennas (not shown) must be proximal, then the specific orientation of the housing can be facilitated by arrangement of the magnets North and South poles. Many geometric shapes may have an inherent planar side or some truncated forms such as a cylinder or a cone including frusto-conical shapes for example, may each have a planar end, in which case a planar end-to-planar end attachment would be made. Other housing shapes may include: a housing which includes a cylinder, a housing which includes a cuboid, a housing which is at least partly conical, a housing which is at least partly frusto-conical, a housing which includes a spheroid, a housing which includes a prism, a housing which includes a poly-hedron, a housing which includes a parabaloid, a housing which includes an ellipsoid. Housing may also be shapes other than symmetric. For example, the housing of a dongle may include a shape akin to a pistol grip or other profusion aiding manipulation of the dongle into the mounting component such as the receptacle. The mounting component housing may also include a: a hollow receiver, a hollow receptacle, a housing having planar coupling surface for planar surface-to-planar surface inductive coupling, a housing having linear alignment mechanism, a housing having hollow receiver and internal linear alignment mechanism, a housing having threaded coupling, a housing having a pull-away coupling, a housing having a pull-away alignment mechanism, a housing having releasable fasteners, a housing having releasable fasteners on a planar surface thereof, a housing having a resilient break-away coupling.

FIG. 11B provides an illustration of a primary inductive housing in a rectangular form 123 that aligns and attaches to a secondary rectangular form 124 on two proximal planar sides using magnetic attraction. A rectangular or other elongate housing form may be used if for example the core profile are an elongated profile such as the U-core shown. FIG. 11C shows the two rectangular housing forms coupled in position for inductive power transfer.

Supplemental ridges or grooves may be added to provide additional support as required.

What is claimed is:

1. A system for the transmission of at least power using inductive wireless coupling comprising:
  a dongle, having a housing which is environmentally sealed,
  a mounting component configured to selectively releasably mate with said dongle,
  wherein said dongle is sized to substantially fit in a palm of a user,
  wherein one of said dongle, said mounting component is adapted for coupling to one of a garment, a structure of a vehicle,
  and wherein the other of said dongle, said mounting component is adapted for coupling to the other of the garment, the structure of the vehicle,
  and wherein said adaption for coupling to the garment, the structure of the vehicle includes an umbilical having a length of substantially in the ranges of 0-30 cm, 0-100 cm respectively,
  and wherein said dongle and said mounting component contain first and second inductive coils and corresponding ferrite cores respectively, said first and second coils configured to be aligned for said inductive coupling when said dongle and said mounting component are said mated so as to provide a substantially closed magnetic path between said first and second coils for at least transfer of power between said first and second coils.

2. The system of claim 1 where said umbilical is mounted at a first end thereof to said dongle.

3. The system of claim 1 wherein said umbilical is mounted at a first end thereof to said mounting component.

4. The system of claim 2 wherein an opposite second end of said umbilical is adapted to be mounted to the garment.

5. The system of claim 2 wherein an opposite second end of said umbilical is adapted to be mounted to the structure of the vehicle.

6. The system of claim 3 where an opposite second end of said umbilical is adapted to be mounted to the garment.

7. The system of claim 3 wherein an opposite second end of said umbilical is adapted to be mounted to the structure of the vehicle.

8. The system of claim 1 wherein a housing of said mounting component is chosen from at least one of the group comprising: a hollow receiver, a hollow receptacle, a housing having planar coupling surface for planar surface-to-planar surface inductive coupling, a housing having linear alignment mechanism, a housing having hollow receiver and internal linear alignment mechanism, a housing having threaded coupling, a housing having a pull-away coupling, a housing having a pull-away alignment mechanism, a housing having releasable fasteners, a housing having releasable fasteners on a planar surface thereof, a housing having a resilient break-away coupling.

9. The system of claim 8 wherein a housing of said dongle is chosen, correspondingly so as to couple with said mounting component, from at least one of the group comprising: a housing which includes a cube, a housing which includes a cylinder, a housing which includes a cuboid, a housing which is at least partly conical, a housing which is at least partly frusto-conical, a housing which includes a spheroid, a housing which includes a prism, a housing which includes a poly-hedron, a housing which includes a parabaloid, a housing which includes an ellipsoid.

10. The system of claim 1 wherein said coils have a low direct current resistance.

11. The system of claim 1 wherein said mounting component is a receptacle, and wherein said dongle mates in said receptacle, and wherein said receptacle includes a drain, whereby said receptacle is self-draining of fluids.

12. The system of claim 11 wherein said drain includes at least one aperture for clearing solids therethrough.

13. The system of claim 1 wherein said mounting component is a shielded receptacle, and wherein said dongle mates in said receptacle, and wherein said coils are adapted for inductive transmission of data.

14. The system of claim 13 further including a transmission-receiving module chosen from the group comprising an RF module, and NFC module.

15. The system of claim 13 wherein said data is from the group comprising: images, video, text, voice.

16. The system of claim 1 wherein, when said dongle or said mounting component are coupled to the garment, said dongle or said mounting component when so coupled are positioned in a pocket of the garment.

17. The system of claim 1 wherein said mounting component is a receptacle and wherein said dongle mates in mating engagement in said receptacle, and wherein said mating engagement is a self-releasing sliding engagement aligned in an alignment so as to release said engagement as a user wearing the garment dis-engages from the structure of the vehicle.

18. The system of claim 17 wherein the structure of the vehicle includes a seat, and wherein said dis-engagement of the user occurs when the user stands-up from a seated position seated in said seat.

19. The system of claim 18 wherein said alignment is substantially in the range 30-150 degrees measured from vertical.

20. The system of claim 17 wherein said alignment is not fixed.

21. The system of claim 20 wherein said mounting component is substantially vertically mounted so as to be upright and is sad not fixed so as to allow self-aligning movement of said alignment during said dis-engagement.

22. The system of claim 1 wherein at least one of said ferrite cores is chosen from the group comprising: elongated u-core, elongated e-core.

\* \* \* \* \*